US011288818B2

(12) United States Patent
Daniilidis et al.

(10) Patent No.: US 11,288,818 B2
(45) Date of Patent: Mar. 29, 2022

(54) METHODS, SYSTEMS, AND COMPUTER READABLE MEDIA FOR ESTIMATION OF OPTICAL FLOW, DEPTH, AND EGOMOTION USING NEURAL NETWORK TRAINED USING EVENT-BASED LEARNING

(71) Applicant: The Trustees of the University of Pennsylvania, Philadelphia, PA (US)

(72) Inventors: Konstantinos Daniilidis, Wynnewood, PA (US); Alex Zihao Zhu, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 113 days.

(21) Appl. No.: 16/795,079

(22) Filed: Feb. 19, 2020

(65) Prior Publication Data
US 2020/0265590 A1    Aug. 20, 2020

Related U.S. Application Data

(60) Provisional application No. 62/807,560, filed on Feb. 19, 2019.

(51) Int. Cl.
*G06T 7/246* (2017.01)
*G06N 3/04* (2006.01)
(52) U.S. Cl.
CPC ........... *G06T 7/246* (2017.01); *G06N 3/0472* (2013.01); *G06T 2207/20084* (2013.01); *G06T 2207/30252* (2013.01)

(58) Field of Classification Search
CPC combination set(s) only.
See application file for complete search history.

(56) References Cited

U.S. PATENT DOCUMENTS

2020/0012940 A1\* 1/2020 Liu ...................... G06T 3/4007
2020/0077023 A1\* 3/2020 Kang ................. H04N 5/23258
(Continued)

OTHER PUBLICATIONS

Bardow , "Simultaneous Optical Flow and Intensity Estimation from an Event Camera," Jun. 2016, Proceedings of the IEEE Conference on Computer Vision and Pattern Recognition (CVPR), pp. 886-889.\*

(Continued)

*Primary Examiner* — Omar S Ismail
(74) *Attorney, Agent, or Firm* — Jenkins, Wilson, Taylor & Hunt, P.A.

(57) ABSTRACT

A method for prediction of an indication of motion using input from an event-based camera includes receiving events captured by an event-based camera, wherein each of the events represents a location of a change in pixel intensity, a polarity of the change, and a time. The method further includes discretizing the events into time discretized event volumes, each of which contain events that occur within a specified time range. The method further includes providing the time discretized event volumes as input to an encoder-decoder neural network trained to predict an indication of motion using a loss function that measures quality of image deblurring; generating, using the neural network, a prediction of the indication of motion. The method further includes using the prediction of the indication of motion in a machine vision application.

24 Claims, 15 Drawing Sheets
(11 of 15 Drawing Sheet(s) Filed in Color)

(56) References Cited

U.S. PATENT DOCUMENTS

2020/0193609 A1* 6/2020 Dharur ................... G06T 7/11
2020/0211206 A1* 7/2020 Wang ................. G06N 20/00

OTHER PUBLICATIONS

Guillermo Gallego, "A Unifying Contrast Maximization Framework for Event Cameras, with Applications to Motion, Depth, and Optical Flow Estimation," Jun. 2018, Proceedings of the IEEE Conference on Computer Vision and Pattern Recognition (CVPR), pp. 3867-3873.*
Anton Mitrokhin, "Event-based Moving Object Detection and Tracking," Oct. 1-5, 2018, 2018 IEEE/RSJ International Conference on Intelligent Robots and Systems (IROS),Madrid, Spain, pp. 6895-6900.*
Guillermo Gallego, "Accurate Angular Velocity Estimation With an Event Camera," Apr. 2017, IEEE Robotics and Automation Letters, vol. 2, No. 2, pp. 632-638.*
Mitrokhin et al., "Event-based Moving Object Detection and Tracking," arXiv:1803.04523v3, pp. 1-8 (Jan. 12, 2020).
Ye et al., "Unsupervised Learning of Dense Optical Flow, Depth and Egomotion from Sparse Event Data," arXiv:1809.08625v2, pp. 1-9 (Feb. 25, 2019).
Zhu et al., "Unsupervised Event-based Learning of Optical Flow, Depth, and Egomotion," University of Pennsylvania, arXiv:1812.08156v1 [cs.CV], pp. 1-9 (Dec. 19, 2018).
Zhu et al., "EV-FlowNet: Self-Supervised Optical Flow Estimation for Event-based Cameras," University of Pennsylvania, arXiv:1802.06898v4 [cs.CV], pp. 1-9 (Aug. 13, 2018).
Wang et al., "Recurrent Neural Network for Learning Dense Depth and Ego-Motion from Video," arXiv:1805.06558v1, pp. 1-18 (May 17, 2018).
Liu et al., "ABMOF: A Novel Optical Flow Algorithm for Dynamic Vision Sensors," arXiv:1805.03988v1, pp. 1-11 (May 10, 2018).
Gallego et al., "A Unifying Contrast Maximization Framework for Event Cameras, with Applications to Motion, Depth, and Optical Flow Estimation," IEEE Conference on Computer Vision and Pattern Recognition (CVPR), arXiv:1804.01306v1, pp. 1-16 (Apr. 4, 2018).
Nguyen et al., "Real-Time 6DOF Pose Relocalization for Event Cameras with Stacked Spatial LSTM Networks," arXiv:1708.09011v3 (Apr. 14, 2018).
Maqueda et al., "Event-based Vision meets Deep Learning on Steering Prediction for Self-driving Cars," IEEE Conference on Computer Vision and Pattern Recognition (CVPR), arXiv:1804.01310v1, pp. 1-9 (Apr. 4, 2018).
Zhu et al., "Realtime Time Synchronized Event-based Stereo," Computer Vision Foundation, ECCV, pp. 1-15(2018).
Zhu et al., "The Multi Vehicle Stereo Event Camera Dataset: An Event Camera Dataset for 3D Perception," arXiv:1801.10202v2, pp. 1-8 (Feb. 19, 2018).
Zhan et al., "Unsupervised Learning of Monocular Depth Estimation and Visual Odometry with Deep Feature Reconstruction," In Proceedings of the IEEE Conference on Computer Vision and Pattern Recognition, pp. 340-349 (2018).
Meister et al., "UnFlow: Unsupervised Learning of Optical Flow with a Bidirectional Census Loss," arXiv:1711.07837v1, pp. 1-9 (Nov. 21, 2017).
Godard et al., "Unsupervised Monocular Depth Estimation with Left-Right Consistency," CVPR, vol. 2, arXiv:1609.03677v3, pp. 1-14 (Apr. 12, 2017).
Amir et al., "A Low Power, Fully Event-Based Gesture Recognition System," CVPR, pp. 7243-7252 (2017).
Mueggler et al., "The event-camera dataset and simulator: Event-based data for pose estimation, visual odometry, and SLAM," The International Journal of Robotics Research, vol. 36, No. 2, pp. 142-149 (2017).

Ren et al., "Unsupervised Deep Learning for Optical Flow Estimation," Proceedings of the Thirty-First AAAI Conference on Artificial Intelligence (AAAI-17), pp. 1-7 (2017).
Binas et al., "DDD17: End-to-End DAVIS Driving Dataset," Institute of Neuroinformatics, arXiv:1711.01458v1, pp. 1-9 (Nov. 7, 2017).
Lagorce et al., "HOTS: A Hierarchy of Event-Based Time-Surfaces for Pattern Recognition," IEEE Transactions on Pattern Analysis and Machine Intelligence, vol. 39, No. 7, pp. 1346-1359 (Jul. 2017).
Zhu et al., "Guided Optical Flow Learning," arXiv:1702.02295v2, pp. 1-5 (Jul. 1, 2017).
Lai et al., "Semi-Supervised Learning for Optical Flow with Generative Adversarial Networks," In Advances in Neural Information Processing Systems, pp. 1-11 (2017).
Vijayanarasimhan et al., "SfM-Net: Learning of Structure and Motion from Video," arXiv:1704.07804v1, pp. 1-9 (Apr. 25, 2017).
Rebecq et al., "Real-time Visual-Inertial Odometry for Event Cameras using Keyframe-based Nonlinear Optimization," University of Zurich, pp. 1-12 (2017).
Zhou et al., "Unsupervised Learning of Depth and Ego-Motion from Video," In CVPR, vol. 2, pp. 1-10 (2017).
Zhu et al., "Event-based Visual Inertial Odometry," In Proceedings of the IEEE Conference on Computer Vision and Pattern Recognition, pp. 5391-5399 (2017).
Zhu et al., "Event-based Feature Tracking with Probabilistic Data Association," In Robotics and Automation (ICRA), pp. 1-6 (2017).
Yu et al., "Back to Basics: Unsupervised Learning of Optical Flow via Brightness Constancy and Motion Smoothness," arXiv:1608.05842v1, pp. 1-4 (Aug. 20, 2016).
Hu et al., "DVS Benchmark Datasets for Object Tracking, Action Recognition, and Object Recognition," Frontiers in Neuroscience, vol. 10, Article 405, pp. 1-5 (Aug. 2016).
Moeys et al., "Steering a Predator Robot using a Mixed Frame/Event-Driven Convolutional Neural Network," In Event-based Control, Communication, and Signal Processing (EBCCSP), 2016 Second International Conference, pp. 1-8 (2016).
Newell et al., "Stacked Hourglass Networks for Human Pose Estimation," arXiv:1603.06937v2, pp. 1-17 (Jul. 26, 2016).
Gallego et al., "Accurate angular velocity estimation with an event camera," IEEE Robotics and Automation Letters, pp. 1-9 (2016).
Rueckauer et al., "Evaluation of Event-Based Algorithms for Optical Flow with Ground-Truth from Inertial Measurement Sensor," Frontiers in Neuroscience, vol. 10, Article 176, pp. 1-17 (Apr. 25, 2016).
Bardow et al., "Simultaneous Optical Flow and Intensity Estimation from an Event Camera," In Proceedings of the IEEE Conference on Computer Vision and Pattern Recognition, pp. 1-9 (2016).
Barranco et al., "A Dataset for Visual Navigation with Neuromorphic Methods," Frontiers in Neuroscience, vol. 10, Article 49, pp. 1-9 (Feb. 2016).
Kim et al., "Real-Time 3D Reconstruction and 6-DoF Tracking with an Event Camera," In European Conference on Computer Vision, pp. 1-16 (2016).
Orchard et al., "Converting Static Image Datasets to Spiking Neuromorphic Datasets Using Saccades," Frontiers in Neuroscience, vol. 9, Article 437, pp. 1-11 (Nov. 16, 2015).
Orchard et al., "Bio-inspired Visual Motion Estimation," arXiv:1511.00096v1, pp. 1-16 (Oct. 31, 2015).
Brosch et al., "On event-based optical flow detection," Frontiers in Neuroscience, vol. 9, Article 137, pp. 1-15 (Apr. 2015).
Jaderberg et al., "Spatial Transformer Networks," Advances in Neural Information Processing Systems, pp. 1-9 (2015).
Ronneberger et al., "U-Net: Convolutional Networks for Biomedical Image Segmentation," In International Conference on Medical Image Computing and Computer-Assisted Intervention, arXiv:1505.04597v1, pp. 1-8 (May 18, 2015).
Brandli et al., "A 240 × 180 130 dB 3 µs Latency Global Shutter Spatiotemporal Vision Sensor," IEEE Journal of Solid-State Circuits, vol. 49, No. 10, pp. 2333-2341 (Oct. 2014).
Benosman et al., "Event-Based Visual Flow," IEEE Transactions on Neural Networks and Learning Systems, vol. 25, No. 2, pp. 407-417 (Feb. 2014).

(56) References Cited

OTHER PUBLICATIONS

Sun et al., "A Quantitative Analysis of Current Practices in Optical Flow Estimation and the Principles Behind Them," Int J Comput Vis, vol. 106, pp. 115-137 (2014).
Benosman et al., "Asynchronous frameless event-based optical flow," Neural Network, vol. 27, pp. 32-37 (2012).
Lichtsteiner et al., "A 128 × 128 120 dB 15 μs Latency Asynchronous Temporal Contrast Vision Sensor," IEEE Journal of Solid-State Circuits, vol. 43, No. 2, pp. 566-576 (Feb. 2008).
Stein, "Efficient Computation of Optical Flow Using the Census Transform," In Joint Pattern Recognition Symposium, pp. 1-9 (2004).
Charbonnier et al., "Two Deterministic Half-Quadratic Regularization Algorithms for Computed Imaging," IEEE International Conference, vol. 2, pp. 168-172 (1994).
Zabih et al., "Non-parametric Local Transforms for Computing Visual Correspondence," In European Conference on Computer Vision, pp. 1-8 (1994).
Lucas et al., "An Iterative Image Registration Technique with an Application to Stereo Vision," Proc 7th Intl Joint Conf on Artificial Intelligence (IJCAI), pp. 674-679 (Aug. 24-28, 1981).
Park et al., "Performance Improvement of Deep Learning Based Gesture Recognition Using Spatiotemporal Demosaicing Technique," 2016 IEEE International Conference on Image Processing (ICIP), pp. 1624-1629 (2016).
Ghosh et al., Real-Time Object Recognition and Orientation Estimation Using an Event-Based Camera and CNN, 2014 IEEE Biomedical Circuits and Systems Conference (BioCAS) Proceedings, pp. 1-4 (2014).
Barranco et al., "Contour Motion Estimation for Asynchronous Event-Driven Cameras," Proceedings of the IEEE, vol. 102, No. 10, pp. 1537-1556 (Oct. 10, 2014).

\* cited by examiner

METHODS, SYSTEMS, AND COMPUTER READABLE MEDIA FOR ESTIMATION OF OPTICAL FLOW, DEPTH, AND EGOMOTION USING NEURAL NETWORK TRAINED USING EVENT-BASED LEARNING

PRIORITY CLAIM

This application claims the priority benefit of U.S. Provisional Patent Application Ser. No. 62/807,560, filed Feb. 19, 2019, the disclosure of which is incorporated herein by reference in its entirety.

GOVERNMENT INTEREST

This invention was made with government support under 1703319 and HR0011-15-2-0020 awarded by the National Science Foundation and the Defense Advanced Research Projects Agency. The government has certain rights in the invention.

TECHNICAL FIELD

The subject matter described herein relates to estimation of optical flow, depth, and egomotion from event-based camera images.

BACKGROUND

In machine vision applications, such as navigation and control of unmanned vehicles, it is desirable to generate predictions or estimates of motion from camera images. Event-based camera images provide event information with high temporal resolution by generating a timestamped event any time a pixel in an image changes in intensity. Existing methods for training and using neural networks to estimate motion from event-based cameras lose at least some of the temporal resolution from the events generated by the event-based cameras by discarding or rounding event timestamps.

Preserving event timestamp information and reducing computational complexity are desirable, but competing, goals in estimating motion from event-based camera output.

Accordingly, there exists a need for improved methods, systems, and computer readable media for estimation of optical flow, depth, and egomotion using a neural network trained using event-based learning.

SUMMARY

A method for prediction of an indication of motion using input from an event-based camera includes receiving events captured by an event-based camera, wherein each of the events represents a location of a change in pixel intensity, a polarity of the change, and a time. The method further includes discretizing the events into time discretized event volumes, each of which contain events that occur within a specified time range. The method further includes providing the time discretized event volumes as input to an encoder-decoder neural network trained to predict an indication of motion using a loss function that measures quality of image deblurring; generating, using the neural network, a prediction of the indication of motion. The method further includes using the prediction of the indication of motion in a machine vision application.

Another method for estimating an indication of motion using input from an event-based camera includes receiving events captured by an event-based camera, wherein each of the events represents a location of a change in pixel intensity, a polarity of the change, and a time. The method further includes generating, from the events, event timestamp images, where each event image includes a first channel that encodes a number of positive events that occurred at each pixel during a time period, a second channel that encodes a number of negative events that occurred at each pixel during the time period; a third channel that encodes the most recent positive event at each pixel, and a fourth channel that encodes the most recent negative event at each pixel. The method further includes providing the event timestamp images as input to a neural network trained using event timestamp images as input and a loss function generated from frame-based camera images synchronized with the event timestamp images as a supervisory signal. The method further includes generating, using the neural network, an estimate of the indication of motion. The method further includes using the estimate of the indication of motion in a machine vision application.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter described herein will now be explained with reference to the accompanying drawings, of which:

FIG. 6 (right image) illustrated depth predicted by the convolutional neural network for the left image;

FIG. 10 (right image) illustrates optical flow predicted by the convolutional neural network for the right image, where the predicted flow is colored according to direction;

FIG. 11 (right image) illustrates a timestamp image corresponding to the left image and in which brighter pixels represent more recent events;

DETAILED DESCRIPTION

Figure 1:
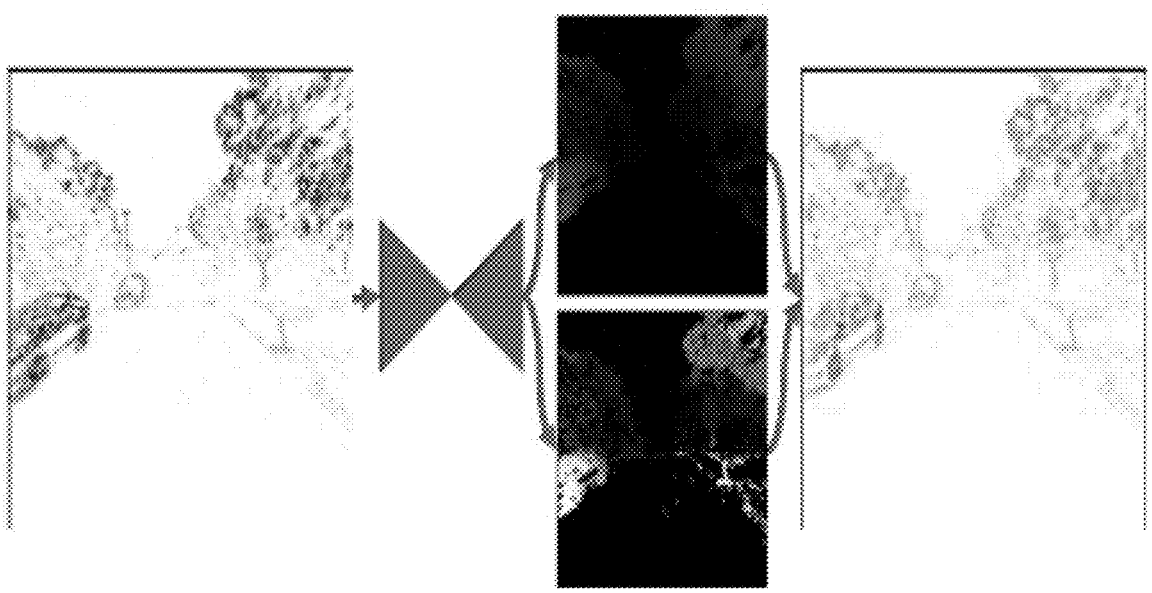
FIG. 1 is a diagram illustrating the use of a convolutional neural network to predict optical flow or egomotion and depth from motion blur in event camera images and to use the predicted values to remove the motion blur from the event camera images.

This disclosure is divided into two parts. The first part, entitled, "Unsupervised Event-Based Learning of Optical Flow, Depth, and Egomotion" relates to training and using a convolutional neural network to predict optical flow, egomotion, and depth using event camera input only and a loss function indicative of event-based image blur to train the network. The second part, entitled, "EV-FlowNet: Self-Supervised Optical Flow Estimation for Event-based Cameras" also relates to training and using a convolutional neural network to predict optical flow using event-based camera input only. However, rather than using a loss function based on event image blurring to train the convolutional neural network, grayscale images taken with the event-based camera that are synchronized with the event images are used to train the convolutional neural network.

Unsupervised Event-Based Learning of Optical Flow, Depth, and Egomotion

In this work, we propose a novel framework for unsupervised learning for event cameras that learns motion information from only the event stream. In particular, we propose an input representation of the events in the form of a discretized volume that maintains the temporal distribution of the events, which we pass through a neural network to predict the motion of the events. This motion is used to attempt to remove any motion blur in the event image. We then propose a loss function applied to the motion compensated event image that measures the motion blur in this image.

We train two networks with this framework, one to predict optical flow, and one to predict egomotion and depths, and evaluate these networks on the Multi Vehicle Stereo Event Camera dataset, along with qualitative results from a variety of different scenes.

1. Introduction

Event cameras are a neuromorphically inspired, asynchronous sensing modality, that detect changes in log light intensity. When a change is detected in a pixel, the camera immediately returns an event, $e=\{x,y,t,p\}$, consisting of the position of the pixel, x; y, timestamp of the change, t, accurate to microseconds, and the polarity of the change, p, corresponding to whether the pixel became brighter or darker. The asynchronous nature of the camera and the tracking in the log image space, provide numerous benefits over traditional frame-based cameras, such as extremely low latency for tracking very fast motions, very high dynamic range, and significantly lower power consumption.

However, the novel output of the cameras provides new challenges in algorithm development. As the events simply reflect whether a change has occurred at a given pixel, a model of photoconsistency, as used traditional motion estimation tasks, such as optical flow or structure from motion (SFM), applied directly on the events is no longer valid. As a result, there has been a significant research drive to develop new algorithms for event cameras to solve these traditional robotics problems.

There have been recent works by Zhu et al. [26] and Ye et al. [19] that train neural networks to learn to estimate these motion tasks in a self and unsupervised manner. These networks abstract away the difficult problem of modeling and algorithm development. However, both works still rely on photoconsistency based principles, applied to the grayscale image and an event image respectively, and, as a result, the former work relies on the presence of grayscale images, while the latter's photoconsistency assumption may not hold valid in very blurry scenes. In addition, both works take inputs that attempt to summarize the event data, and as a result lose temporal information.

In this work, we resolve these deficiencies by proposing a novel input representation that captures the full spatiotemporal distribution of the events, and a novel set of unsupervised loss functions that allows for efficient learning of motion information from only the event stream. Our input representation, a discretized event volume, discretizes the time domain and then accumulates events in a linearly weighted fashion similar to interpolation. This representation encodes the distribution of all of the events within the spatiotemporal domain. We train two networks to predict optical flow or ego-motion and depth and use the predictions to attempt to remove the motion blur from the event stream, as visualized in FIG. 1. Our unsupervised loss then measures the amount of motion blur in the corrected event image, which provides a training signal to the network. In addition, our deblurred event images are comparable to edge maps, and so we apply a photometric stereo loss on the census transform of these images to allow our network to learn metric poses and depths.

As illustrated in FIG. 1, the convolutional neural network (represented by the opposing triangles) learns to predict motion from motion blur by predicting optical flow (shown by different colors in the top image) or egomotion and depth (shown by different colors in the bottom image) from a set of input, blurry, events from an event camera (see left image), and minimizing the amount of motion blur after deblurring with the predicted motion to produce the deblurred image (see right image). An example of the blurred event image can be seen from the car on the left hand side of the event image. After motion compensation is applied, the image of the car is sharp and free from blurring, as seen in the right image.

We evaluate both methods on the Multi Vehicle Stereo Event Camera dataset [25][26], and compare against the equivalent grayscale based methods, as well as the prior state of the art by [26].

Our contributions can be summarized as:
- A novel discretized event volume representation for passing events into a neural network.
- A novel application of a motion blur based loss function that allows for unsupervised learning of motion information from events only.
- A novel stereo photometric loss applied on the census transform of a pair of deblurred event images.
- Quantitative evaluations on the Multi Vehicle Stereo Event Camera dataset [25], with qualitative and quantitative evaluations from a variety of nighttime and other challenging scenes.

2. Related Work

Since the introduction of event cameras, such as Lichtsteiner et al. [10], there has been a strong interest in the development of algorithms that leverage the benefits provided by these cameras. In the work of optical flow, Benosman et al. [2] show that normal flow can be estimated by fitting a plane to the events in x-y-t space. Bardow et al. [1] show that flow estimation can be written as a convex optimization problem that solves for the image intensity and flow jointly.

In the space of SFM and visual odometry, Kim et al. [9] demonstrate that a Kalman filter can reconstruct the pose of the camera and a local map. Rebecq et al. [15] similarly build a 3D map, which they localize from using the events. Zhu et al. [23] use an expectation maximization (EM)-based feature tracking method to perform visual-inertial odometry, while Rebecq et al. [15] use motion compensation to deblur the event image, and run standard image-based feature tracking to perform visual-inertial odometry.

For model-free methods, self-supervised and unsupervised learning have allowed deep networks to learn motion and the structure of a scene, using only well-established geometric principles. Yu et al. [8] established that a network can learn optical flow from brightness constancy with a smoothness prior, while Maqueda et al. [11] extend this work by applying a bidirectional census loss to improve the quality of the flow. In a similar fashion, Zhou et al. [22] show that a network can learn a camera's egomotion and depth using camera reprojection and a photoconsistency loss. Zhan et al. [21] and Vijayanarasimhan et al. [17] add in a stereo constraint, allowing the network to learn absolute scale, while Wang et al. [18] apply this concept with a recurrent neural network.

Recently, there have been several works, such as [4, 5, 13, 26, 24], that have shown that optical flow, and other types of motion information, can be estimated from a spatiotemporal volume of events, by propagating the events along the optical flow direction, and attempting to minimize the motion blur in the event image. This concept of motion blur as a loss can be seen as an analogy to the photometric error in frames, as applied to events. In this work, we adapt a novel formulation of this loss from Mitrokhin et al. [13] for a neural network, by generating a single fully differentiable loss function that allows our networks to learn optical flow and structure from motion in an unsupervised manner.

3. Method

Our pipeline consists of a novel volumetric representation of the events, which we describe in Sec. 3.1, which is passed through a fully convolutional neural network to predict flow and/or egomotion and depth. We then use the predicted motion to try to deblur the events and apply a loss that minimizes the amount of blur in the deblurred image, as described in Sec. 3.2. This loss can be directly applied to our optical flow network, Sec. 3.3. For the egomotion and depth network, we describe the conversion to optical flow in Sec. 3.4.1, as well as a novel stereo disparity loss in Sec. 3.4.2. Our architecture is summarized in FIG. 2.

Figure 2:
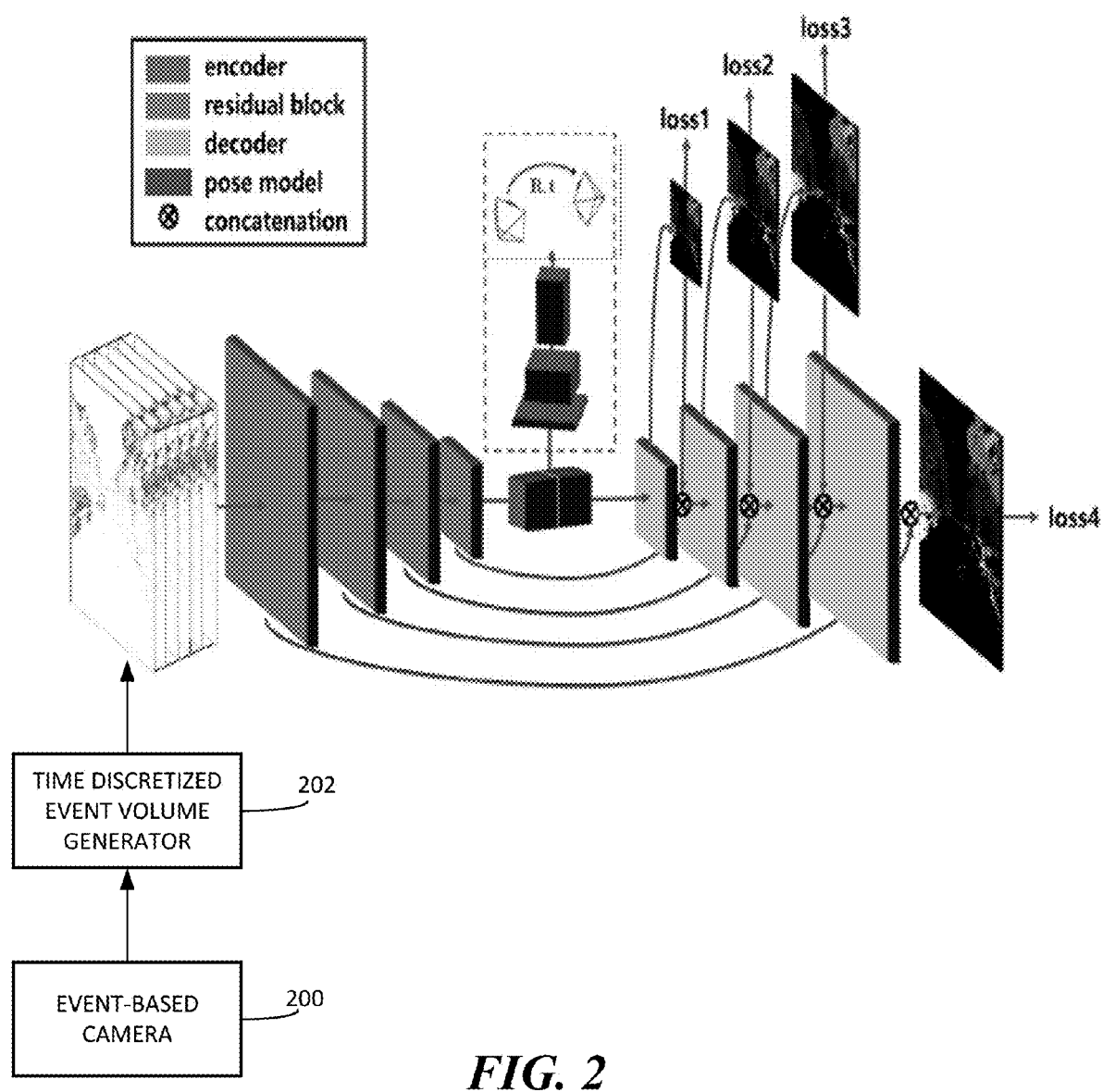
FIG. 2 is a diagram illustrating network architectures of convolutional neural networks for predicting optical flow or egomotion and depth from event-based camera images.

In FIG. 2, network architectures for both the optical flow and egomotion and depth networks are shown. In the optical flow network, only the encoder-decoder neural network is used, while in the egomotion and depth network, the encoder-decoder is used to predict depth, while the pose model predicts the egomotion. At training time, the loss is applied at each stage of the decoder, before being concatenated into the next stage of the network. As will be described in detail below, the loss function used to train the encode/decoder section of the network is indicative of blur in the event image and is minimized.

The inputs to the neural network illustrated in FIG. 2 are time discretized event volumes generated from events captured from an event-based camera. In FIG. 2, event-based camera 200 captures events, where each event includes a set of x and y coordinates, a polarity, and a timestamp. A time discretized event volume generator 202 generates time discretized event volumes from the events generated by event-based camera 200 and outputs the time-discretized event volumes to the encoder-decoder neural network. The time-discretized event volumes may be generated as described below in section 3.1, using Equations (1)-(3)

Figure 3:
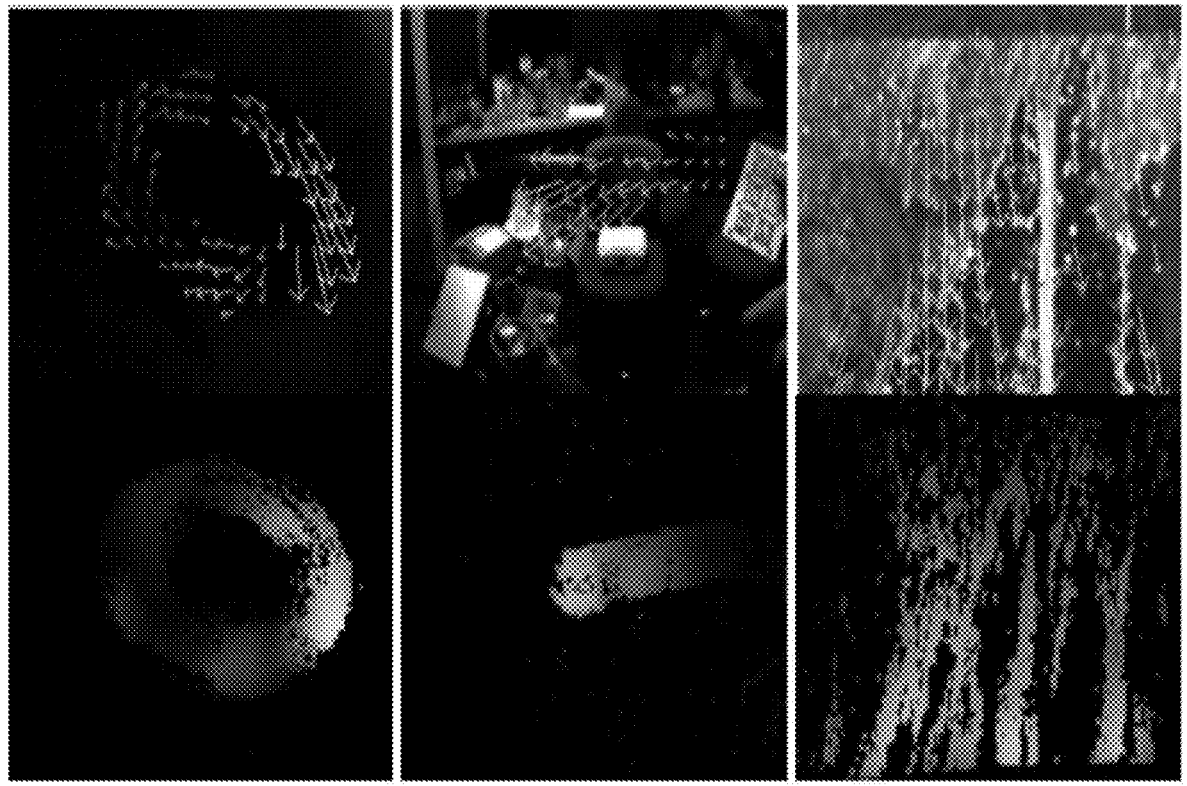
FIG. 3 illustrates images of flow vectors produced by the neural networks illustrated in FIG. 2.

Once the network is trained, the loss function is omitted, and the output of each encoder stage is an activation of an event volume image input at a different resolution (resolution decreases from left to right with each encoder stage and increases from left to right with each decoder stage). The residual blocks in the center of the encoder-decoder neural network respectively perform convolution and deconvolution operations without changing the resolution of the input image. At each decoder stage, the input is deconvolved and the concatenated with activation from the encoder at the corresponding resolution. The output of the last decoder stage is an indication of optical flow. The output of the pose model stages in the center of the diagram is an indication of image depth FIG. 3 illustrates flow vectors produced by the neural network illustrated in FIG. 2 for a variety of different scenes. The top images in FIG. 3 are a subset of flow vectors plotted on top of the grayscale image from the DAVIS camera. The bottom images are the dense flow output of the network at pixels with events, colored by the direction of the flow. From left to right, the top and bottom images in FIG. 3 are flow output for 1) a fidget spinner spinning at 13 rad/s in a very dark environment, 2) a ball thrown quickly in front of the camera (the grayscale image does not pick up the ball at all), and 3) water flowing outdoors.

3.1. Input: The Discretized Event Volume

Selecting the appropriate input representation of a set of events for a neural network is still a challenging problem. Prior works such as Moeys et al. [14] and Maqueda et al. [11] generate an event image by summing the number of events at each pixel. However, this discards the rich temporal information in the events and is susceptible to motion blur. Zhu et al. [26] and Ye et al. [19] propose image representations of the events, that summarize the number of events at each pixel, as well as the last timestamp and average timestamp at each pixel, respectively. Both works show that this is sufficient for a network to predict accurate optical flow. While this maintains some of the temporal information, a lot of information is still lost by summarizing the high resolution temporal information in the events.

In this document, we propose a novel input representation generated by discretizing the time domain. In order to improve the resolution along the temporal domain beyond the number of bins, we insert events into this volume using a linearly weighted accumulation similar to bilinear interpolation. The purpose of the discretization of the time domain is to deal with non-integer pixel values caused by a microsecond resolution event timer and ranges of event times that are on the order of hundreds of milliseconds. Discretizing microsecond timed events into B bins, where B is an integer, requires that non-integer event times be scaled to integer values. Scaling the event times using Equations (1)-(3) below instead of simply rounding the event times preserves temporal resolution of the events and leads to more accurate motion estimation.

Given a set of N input events $\{(x_i,y_i,t_i,p_i)\} i \in [1,N]$, and a set B bins to discretize the time dimension, we scale the timestamps to the range [0;B−1], and generate the event volume as follows:

$$t_i^* = (B-1)(t_i - t_0)/(t_N - t_1) \quad (1)$$

$$V(x, y, t) = \sum_i p_i k_b(x - x_i) k_b(y - y_i) k_b(t - t_i^*) \quad (2)$$

$$k_b(a) = \max(0, 1 - |a|) \quad (3)$$

where $k_b(\alpha)$ is equivalent to the bilinear sampling kernel defined in Jaderberg et al. [7]. Note that the interpolation in the x and y dimensions is necessary when camera undistortion or rectification is performed, resulting in non-integer pixel positions.

In the case where no events overlap between pixels, this representation allows us to reconstruct the exact set of events. When multiple events overlap on a voxel, the summation does cause some information to be lost, but the resulting volume still retains the distribution of the events across both the spatial and temporal dimensions within the window.

In this work, we treat the time domain as channels in a traditional 2D image and perform 2D convolution across the x; y spatial dimensions. We have tested a network with full 3D convolutions across this volume, but found negligible performance increases for a significant increase in processing time.

3.2. Supervision Through Motion Compensation

As event cameras register changes in log intensity, the standard model of photoconsistency does not directly apply onto the events. Instead, several works have applied the concept of motion compensation, as described in Rebecq et al. [15], as a proxy for photoconsistency when estimating motion from a set of events. The goal of motion compensation is to use the motion model of each event to deblur the event image, as visualized in FIG. 4.

Figure 4:
FIG. 4 (center image) is a blurred image output from an event camera; (left image) illustrates optical flow predicted by the optical flow neural network of FIG. 2; (right image) illustrates a deblurred image produced by the optical flow neural network of FIG. 2 given the predicted optical flow.

FIG. 4 provides examples for which the neural network learns to predict motion from motion blur by predicting optical flow or egomotion and depth (left) from a set of input, blurry, events (center), and minimizing the amount of motion blur after deblurring with the predicted motion to produce the deblurred image (right).

For the most general case of per pixel optical flow, u(x,y),v(x,y), we can propagate the events, $\{(x_i,y_i,t_i,p_i)\} i=1$, to a single time t':

$$\begin{pmatrix} x_i' \\ y_i' \end{pmatrix} = \begin{pmatrix} x_i \\ y_i \end{pmatrix} + (t' - t_i) \begin{pmatrix} u(x_i, y_i) \\ v(x_i, y_i) \end{pmatrix} \quad (4)$$

If the input flow is correct, this has the effect of reversing the motion in the events, and removing the motion blur, while for an incorrect flow, this will likely induce further motion blur.

We use a measure of the quality of this deblurring effect as the main supervision for our network. Gallego et al. [4] proposed using the image variance on an image generated by the propagated events. However, we found that the network would easily overfit to this loss, by predicting flow values that push all events within each region of the image to a line. This effect is discussed further in the section below entitled, "Unsupervised Event-Based Learning of Optical Flow, Depth, and Egomotion Supplemental". Instead, we adopt the loss function described by Mitrokhin et al. [13], who use a loss function that minimizes the sum of squares of the average timestamp at each pixel.

However, the previously proposed loss function is non-differentiable, as the authors rounded the timestamps to generate an image. To resolve this, we generate the average timestamp image using bilinear interpolation. We apply the loss by first separating the events by polarity and generating an image of the average timestamp at each pixel for each polarity, $T_+$, $T_-$:

$$T_{p'}(x, y | t') = \frac{\sum_i \mathbb{1}(p_i = p') k_b(x - x_i') k_b(y - y_i') t_i}{\sum_i \mathbb{1}(p_i = p') k_b(x - x_i') k_b(y - y_i')} \quad (5)$$

$$p' \in \{+, -\}$$

$$k_b(a) = \max(0, 1 - |a|) \quad (6)$$

The loss is, then, the sum of the two images squared.

$$\mathcal{L}_{time}(t') = \sum_x \sum_y T_+(x, y | t')^2 + T_-(x, y | t')^2 \quad (7)$$

However, using a single t' for this loss poses a scaling problem. In (4), the output flows, u;v, are scaled by (t'−$t_i$). During backpropagation, this will weight the gradient over events with timestamps further from t' higher, while events with timestamps very close to t' are essentially ignored. To mitigate this scaling, we compute the loss both backwards and forwards, with t'=0 and t'=$t_{N-1}$, allowing all of the events to contribute evenly to the loss:

$$\mathcal{L}_{time}=\mathcal{L}_{time}(t_0)+\mathcal{L}_{time}(t_{N-1}) \qquad (8)$$

Note that changing the target time, t', does not change the timestamps used in (5).

This loss function is similar to that of Benosman et al. [2], who model the events with a function $\Sigma_{e_i}$ such that $\Sigma_{e_i}(x_i)=t_i$. In their work, they assume that the function is locally linear and solve the minimization problem by fitting a plane to a small spatiotemporal window of events. Indeed, we can see that the gradient of the average timestamp image, $$\left( \frac{dt}{dx}, \frac{dt}{dy} \right),$$

corresponds to the inverse of the flow, if we assume that all events at each pixel have the same flow.

3.3. Optical Flow Prediction Network

Using the input representation and loss described in Sec. 3.1 and 3.2, we train a neural network to predict optical flow. We use an encoder-decoder style network, as in [26]. The network outputs flow values in units of pixels/bin, which we apply to (4), and eventually compute (11).

Our flow network uses the temporal loss in (8), combined with a local smoothness regularization:

$$\mathcal{L}_{smooth} = \sum_{\vec{x}} \sum_{\vec{y} \in N(\vec{x})} \rho(u(\vec{x}) - u(\vec{y})) + \rho(v(\vec{x}) - v(\vec{y})) \qquad (9)$$

$$\rho(x) = \sqrt{x^2 + \epsilon^2} \qquad (10)$$

where p(x) is the Charbonnier loss function [3], and N(x,y) is the 4-connected neighborhood around (x,y).

The total loss for the flow network is:

$$\mathcal{L}_{flow}=\mathcal{L}_{time}+\lambda_1 \mathcal{L}_{smooth} \qquad (11)$$

3.4. Egomotion and Depth Prediction Network

We train a second network to predict the egomotion of the camera and the structure of the scene, in a similar manner to [21, 17]. Given a pair of time synchronized discretized event volumes from a stereo pair, we pass each volume into our network separately, but use both at training time to apply a stereo disparity loss, allowing our network to learn metric scale. We apply a temporal timestamp loss defined in Sec. 3.2, and a robust similarity loss between the census transforms [20, 16] of the deblurred event images.

The network predicts Euler angles, ($\psi$, B, $\phi$), a translation, T, and the disparity of each pixel, $d_i$. The disparities are generated using the same encoder-decoder architecture as in the flow network, except that the final activation function is a sigmoid, scaled by the image width. The pose shares the encoder network with the disparity and is generated by strided convolutions which reduce the spatial dimension from 16×16 to 1×1 with 6 channels.

3.4.1 Temporal Reprojection Loss

Given the network output, the intrinsics of the camera, K, and the baseline between the two cameras, b, the optical flow, ($u_i, v_i$) of each event at pixel location ($x_i, y_i$) is:

$$\begin{pmatrix} x_i^* \\ y_i^* \end{pmatrix} = K\pi \left( R \frac{fb}{d_i} K^{-1} \begin{pmatrix} x_i \\ y_i \\ 1 \end{pmatrix} + T \right) \qquad (12)$$

$$\begin{pmatrix} u_i \\ v_i \end{pmatrix} = \frac{1}{B-1}\left( \begin{pmatrix} x_i^* \\ y_i^* \end{pmatrix} - \begin{pmatrix} x_i \\ y_i \end{pmatrix} \right) \qquad (13)$$

where f is the focal length of the camera, R is the rotation matrix corresponding to ($\psi$, B, $\phi$) and $\pi$ is the projection function:

$$\pi((X \ Y \ Z)^T) = \left( \frac{X}{Z} \ \frac{Y}{Z} \right)^T.$$

Note that, as the network only sees the discretized volume at the input, it does not know the size of the time window. As a result, the optical flow we compute is in terms of pixels/bin, where B is the number of bins used to generate the input volume. The optical flow is then inserted into (4) for the loss.

3.4.2 Stereo Disparity Loss

From the optical flow, we can deblur the events from the left and right camera using (4), and generate a pair of event images, corresponding to the number of events at each pixel after deblurring. Given correct flow, these images represent the edge maps of the corresponding grayscale image, over which we can apply a photometric loss. However, the number of events between the two cameras may also differ, and so we apply a photometric loss on the census transforms [20] of the images. For a given window width, W, we encode each pixel with a $W^2$ length vector, where each element is the sign of the difference between the pixel and each neighbor inside the window. For the left event volume, the right census transform is warped to the left camera using the left predicted disparities, and we apply a Charbonnier loss (10) on the difference between the two images, and vice versa for the right.

In addition, we apply a left-right consistency loss between the two predicted disparities, as defined by [6].

Finally, we apply a local smoothness regularizer to the disparity, as in (9).

The total loss for the SFM model is:

$$\mathcal{L}_{SFM}=\mathcal{L}_{temporal}+\lambda_2 \mathcal{L}_{stereo}+\lambda_3 \mathcal{L}_{consistency}+\lambda_4 \mathcal{L}_{smoothness} \qquad (14)$$

4. Experiments

4.1. Implementation Details

We train two networks on the full outdoor_day2 sequence from MVSEC [25], which consists of 11 minutes of stereo event data driving through public roads. At training, each input consists of N=30000 events, which are converted into discretized event volumes with resolution 256×256 (centrally cropped) and B=9 bins. The weights for each loss are: $\{\lambda_1, \lambda_2, \lambda_3, \lambda_4\}=\{1.0, 1.0, 0.1, 0.2\}$.

4.2. Optical Flow Evaluation

We tested our optical flow network on the indoor flying and outdoor day sequences from MVSEC, with the ground truth provided by [26]. Flow predictions were generated at each grayscale frame timestamp and scaled to be the displacement for the duration of 1 grayscale frame (dt=1) and 4 grayscale frames (dt=1), separately. For the outdoor day sequence, each set of input events was fixed at 30000, while for indoor flying, 15000 events were used due to the larger motion in the scene.

For comparison against the ground truth, we convert the output of the network, ($u$; $v$), from units of pixels/bin into units of pixel displacement with the following:

$$(\hat{u},\hat{v})=(u,v) \times (B-1) \times dt/(t_N-t_0),$$

where dt is the test time window size.

We present the average endpoint error (AEE), and the percentage of points with AEE greater than 3 pixels, over pixels with valid ground truth flow and at least one event. These results can be found in Table. 1, where we compare our results against EV-FlowNet [26], the grayscale Un-Flow [12], and ECN [19]. However, we would like to note that most of the results provided by ECN [19] are evaluated on training data.

by SFMLearner is only up to a scale factor, we present errors in terms of angular error between both the predicted translation and rotations.

The relative pose errors (RPE) and relative rotation errors (RRE) are computed as:

$$RPE = \arccos\left(\frac{t_{pred} \cdot t_{gt}}{\|t_{pred}\|_2 \|t_{gt}\|_2}\right),$$

RRE=$\|\log m(R_{pred}^T R_{gt})\|_2$, where $R_{pred}$ is the rotation matrix corresponding to the Euler angles output from each network, and log m is the matrix logarithm.

4.4. Depth Network Evaluation

We compare our depth results against Monodepth [6], which learns monocular disparities from a stereo pair at training time, with an additional left-right consistency loss. As the DAVIS stereo grayscale images are not time syn-

TABLE 1

Quantitative evaluation of our optical flow network compared to EV-FlowNet, UnFlow and ECN. For each sequence, Average Endpoint Error (AEE) is computed in pixels, % Outlier is computed as the percent of points with AEE < 3 pix. dt = 1 is computed with a time window between two successive grayscale frames, dt = 4 is between four grayscale frames.

| dt = 1 frame | outdoor day1 | | indoor flying1 | | indoor flying2 | | indoor flying3 | |
|---|---|---|---|---|---|---|---|---|
| | AEE | % Outlier | AEE | % Outlier | AEE | % Outlier | AEE | % Outlier |
| Ours | 0.32 | 0.0 | 0.58 | 0.0 | 1.02 | 4.0 | 0.87 | 3.0 |
| EV-FlowNet | 0.49 | 0.2 | 1.03 | 2.2 | 1.72 | 15.1 | 1.53 | 11.9 |
| UnFlow | 0.97 | 1.6 | 0.50 | 0.1 | 0.70 | 1.0 | 0.55 | 0.0 |
| ECN$_{marked}$ | 0.36 | 0.2 | 0.20* | 0.0* | 0.24* | 0.0* | 0.21* | 0.0* |

| dt = 4 frames | outdoor day1 | | indoor flying1 | | indoor flying2 | | indoor flying3 | |
|---|---|---|---|---|---|---|---|---|
| | AEE | % Outlier | AEE | % Outlier | AEE | % Outlier | AEE | % Outlier |
| Ours | 1.30 | 9.7 | 2.18 | 24.2 | 3.85 | 46.8 | 3.18 | 47.8 |
| EV-Flow Net | 1.23 | 7.3 | 2.25 | 24.7 | 4.05 | 45.3 | 3.45 | 39.7 |
| UnFlow | 2.95 | 40.0 | 3.81 | 56.1 | 6.22 | 79.5 | 1.96 | 18.2 |
| ECN$_{marked}$ | — | — | — | — | — | — | — | — |

*Evaluated on training data.

4.3. Egomotion Evaluation

We evaluate our ego-motion estimation network on the outdoor_day1 sequence from MVSEC. We were only able to achieve reasonable results for outdoor_day1, as the egomotion network did not generalize as well for the indoor flying sequences and failed when observing fluorescent lights in the outdoor night sequences. This is discussed further in the results in Sec. 5.

As there is currently no public code to the extent of our knowledge for unsupervised deep SFM methods with a stereo loss, we compare our ego-motion results against SFMLearner by Zhou et al. [22], which learns egomotion and depth from monocular grayscale images, while acknowledging that our loss has access to an additional stereo image at training time. We train the SFMLearner models on the VI-Sensor images from the outdoor day2 sequence, once again cropping out the hood of the car. These images are of a higher resolution than the DAVIS images, but are from the same scene, and so should generalize as well as training on the DAVIS images. The model is trained from scratch for 100k iterations. As the translation predicted chronized, we once again train on the cropped VI-Sensor images. The model is trained for 50 epochs, and we provide depth errors for points with thresholds up to 10 m, 20 m and 30 m in the ground truth and with at least one event. As the results from ECN are up to a scale and only provide relative depth results, we do not include them in our comparison.

5. Results

5.1. Optical Flow

From the quantitative results in Table 1, we can see that our method outperforms EV-FlowNet in almost all experiments and nears the performance of UnFlow on the short 1 frame sequences. We also outperform ECN in the outdoor_day1 sequence. We perform worse than ECN in the other sequences, but this is likely because these were in the training set for ECN. Qualitative results from these experiments can also be found in FIG. 7.

Figure 7:
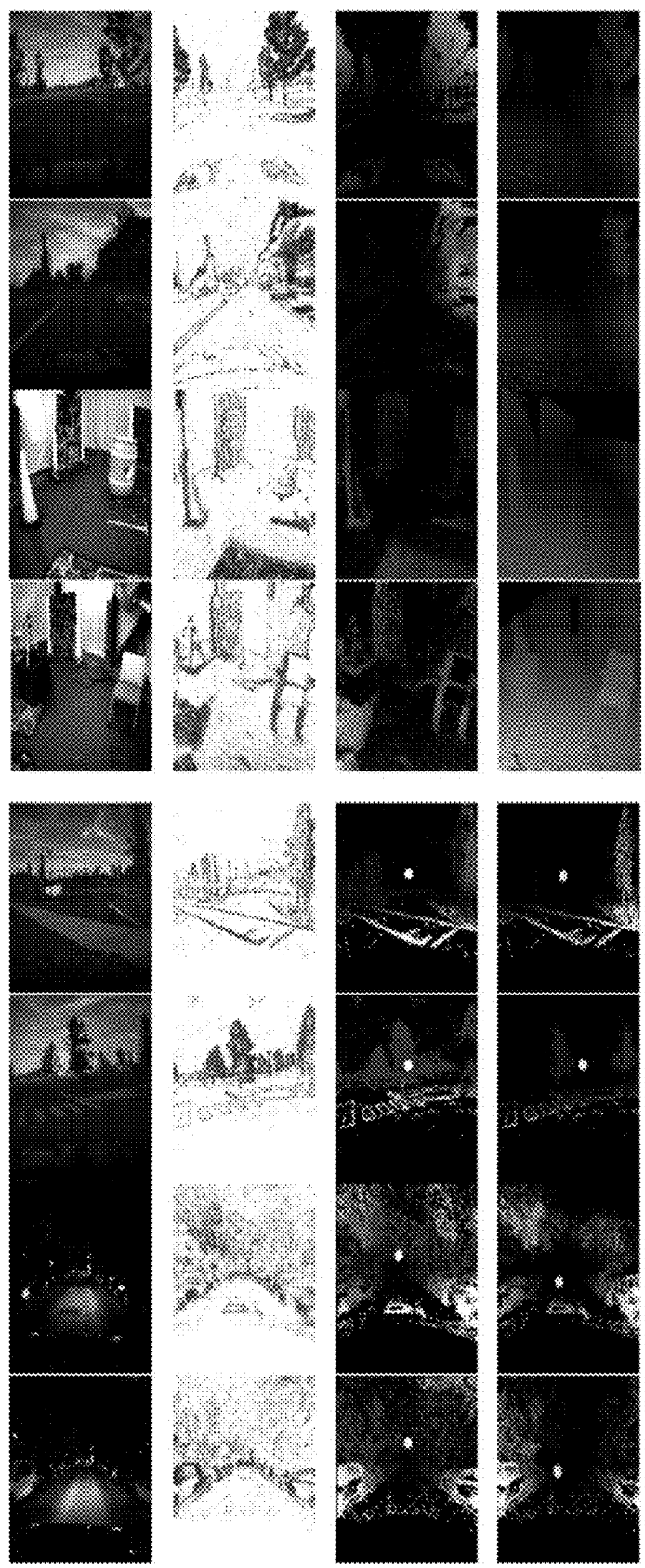
FIG. 7 illustrates qualitative outputs from the optical flow and egomotion and depth network on the indoor flying, outdoor day and outdoor night sequences. From left to right: Grayscale image, event image, depth prediction with heading direction, ground truth with heading direction. The top four images are flow results, the bottom four images are depth results. For depth, closer is brighter. Heading direction is drawn as a circle.

FIG. 7 illustrates qualitative outputs from the optical flow and egomotion and depth network on the indoor flying, outdoor day and outdoor night sequences. From left to right:

Grayscale image, event image, depth prediction with heading direction, ground truth with heading direction. Top four are flow results, bottom four are depth results. For depth, closer is brighter. Heading direction is drawn as a circle.

In general, we have found that our network generalizes to a number of very different and challenging scenes, including those with very fast motions and dark environments. A few examples of this can be found in FIG. 3. We believe this is because the events do not have the fine grained intensity information at each pixel of traditional images, and so there is less redundant data for the network to overfit. However, our network does still struggle with events that are generated not as a result of motion, e.g., when there is a flashing light in the scene.

5.2. Egomotion

Figure 5:
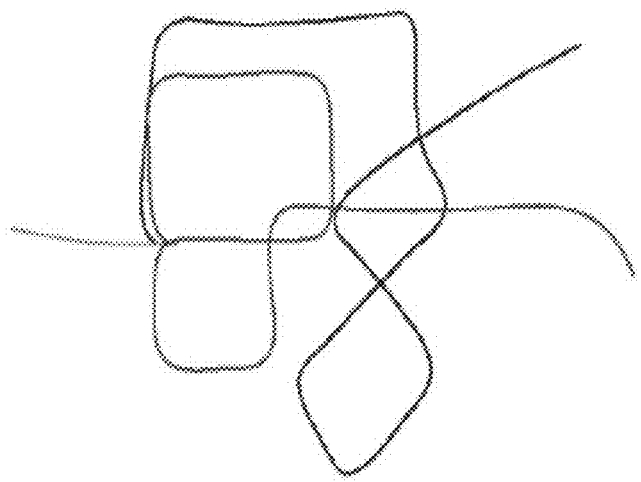
FIG. 5 illustrates ground truth and recovered trajectories generated from blurred event camera images.

Our model trained on outdoor_day2 was able to generalize well to outdoor_day1, even though the environment is changed significantly from an outdoor residential environment to a closed office park area. In Table 2, we show that our relative pose and rotation errors are significantly better than that of SFM-Learner, although this must be at least partially credited to the fact that our network has access to stereo images at training time. In addition, we show a section of the recovered trajectory in FIG. 5, which illustrates the simulated trajectory on outdoor_day1 generated by concatenating egomotion predictions. Red: ground truth (GT), Blue: Ours, Green: SFMLearner with GT scale.

TABLE 2

Quantitative evaluation of our depth network compared to Monodepth [6]. The average depth error is provided for all points in the ground truth up to 10 m, 20 m and 30 m, with at least one event.

| Threshold distance | Average depth Error (m) | | |
|---|---|---|---|
| | 10 m | 20 m | 30 m |
| outdoor_day1 | | | |
| Ours | 2.72 | 3.84 | 4.40 |
| Monodepth | 3.44 | 7.02 | 10.03 |
| outdoor_night1 | | | |
| Ours | 3.13 | 4.02 | 4.89 |
| Monodepth | 3.49 | 6.33 | 9.31 |
| outdoor_night2 | | | |
| Ours | 2.19 | 3.15 | 3.92 |
| Monodepth | 5.15 | 7.8 | 10.03 |
| outdoor_night3 | | | |
| Ours | 2.86 | 4.46 | 5.05 |
| Monodepth | 4.67 | 8.96 | 13.36 |

TABLE 3

Quantitative evaluation of our egomotion network compared to SFM Learner.

| | ARPE (DEG) | ARRE (RAD) |
|---|---|---|
| OURS | 7.74 | 0.00867 |
| SFM LEARNER [22] | 16.27 | 0.00939 |

ARPE: Average Relative Pose Error.
ARRE: Average Relative Rotation Error.

Due to the change in scene between outdoor_day1 and outdoor_day2, the network overestimates the scale of the trajectory, but is able to mostly accurately capture the rotation and so the shape of the trajectory. SFM-Learner, on the other hand, consistently underestimates the rotation, and so diverges very quickly.

Unlike the flow network, both the egomotion and depth networks tended to memorize more of the scene and as a result were unable to generalize well to sequences such as indoor flying. However, this still has valuable applications in operations where the environment does not vary significantly, such as geo-fenced autonomous driving applications.

In addition, as the network was only trained on driving sequences, we were unable to achieve good egomotion generalization to the outdoor night sequences. We found that this was due to the fluorescent lamps found at night, which generated many spurious events due to their flashing that were not related to motion in the scene. As our egomotion network takes in global information in the scene, it tended to perceive these flashing lights as events generated by camera motion and as a result generated an erroneous egomotion estimate. Future work to filter these kinds of anomalies out would be necessary for these networks to perform well. For example, if the rate of the flashing is known a-priori, the lights can be simply filtered by detecting events generated at the desired frequency.

5.3. Depth

Figure 6:
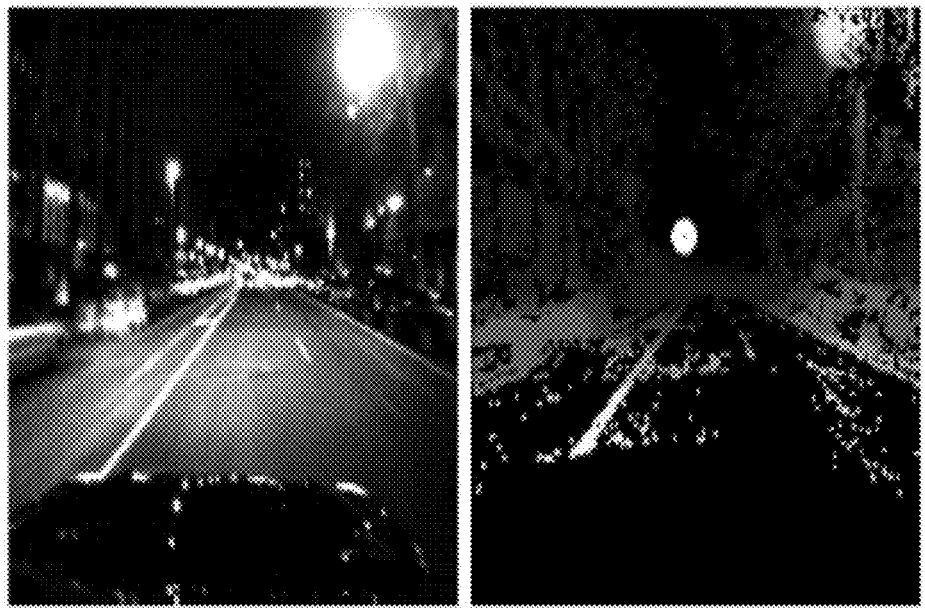
FIG. 6 (left image) is a scene at night with a flashing streetlight captured by an event camera.

Our depth model was able to produce good results for all of the driving sequences, although it is unable to generalize to the flying sequences. This is likely because the network must memorize some concept of metric scale, which cannot generalize to completely different scenes. We outperform Monodepth in all of the sequences, which is likely because the events do not have intensity information, so the network is forced to learn geometric properties of objects. In addition, the network generalizes well even in the face of significant noise at night, although flashing lights cause the network to predict very close depths, such as FIG. 6, which illustrates a failure case of our depth network, the flashing streetlight is detected as a very close object due to spurious events.

6. Conclusions

In this work, we demonstrate a novel input representation for event cameras, which, when combined with our motion compensation based loss function, allows a deep neural network to learn to predict optical flow and ego-motion and depth from the event stream only.

7. Exemplary Implementation

Figure 8:
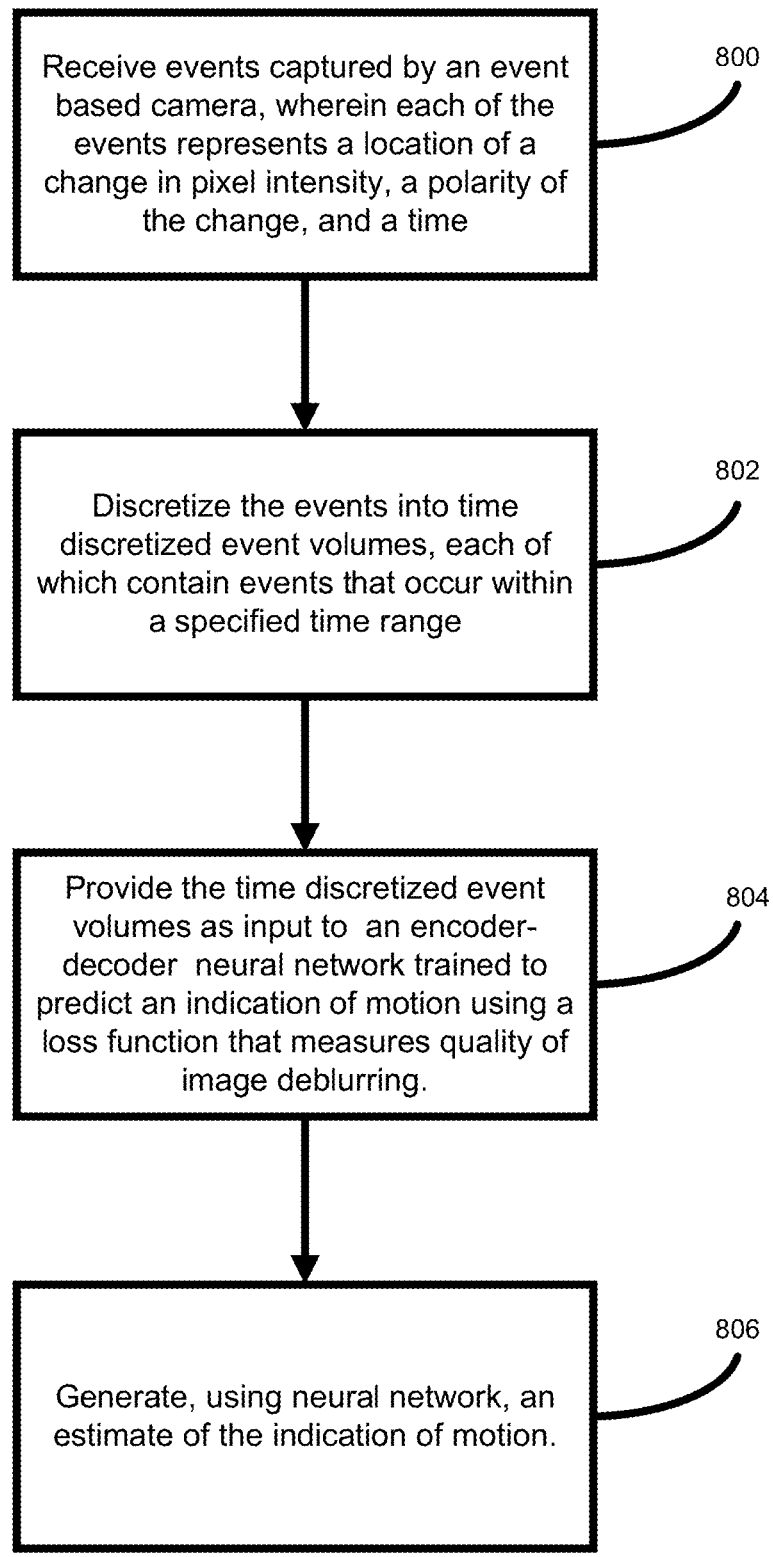
FIG. 8 is a flow chart illustrating an exemplary method for prediction of an indication of motion using input from an event-based camera.

FIG. 8 is a flow chart of an exemplary method for prediction of an indication of motion using input from an event-based camera. The method illustrated in FIG. 8 may be implemented using the neural network illustrated in FIG. 2, with inputs generated using time discretized event volume generator 202. Time discretized event volume generator 202 and the neural network illustrated in FIG. 2 may be implemented on a computing platform including at least one processor.

Referring to FIG. 8, in step 800, the process includes receiving events captured by an event-based camera, wherein each of the events represents a location of a change in pixel intensity, a polarity of the change, and a time. For example, as illustrated in FIG. 2, event-based camera 200 may generate events when pixels in a scene change in intensity. A change from dark to light indicates a positive polarity event, where a change from light to dark indicates a negative polarity event. In addition to recording polarity, event-based camera 200 generates a set of coordinates (x,y) and a timestamp associated with each event.

In step 802, the method includes discretizing the events into time discretized event volumes, each of which contain events that occur within a specified time range. For example, time discretized event volume generator 202 illustrated in FIG. 2 may generate the time discretized event volumes using Equations (1)-(3).

In step 804, the method includes providing the time discretized event volumes as input to an encoder-decoder neural network trained to predict an indication of motion using a loss function that measures quality of image deblurring. For example, time-discretized event volume generator 202 may provide the time-discretized event volumes to the encoder-decoder neural network In step 806, the process includes generating, using the neural network, an estimate of the indication of motion. For example, the neural network illustrated in FIG. 2 may generate estimates of indications of motion, such as optical flow, depth, and motion of the event-based camera or egomotion. In one example, the optical flow may include optical flow values per pixel.

The estimate of the indication of motion may be used in a machine vision application. For example, the estimate of camera motion may be used to estimate motion of an unmanned aerial, land, or water-based vehicle for self-navigation of the vehicle and collision avoidance.

Unsupervised Event-Based Learning of Optical Flow, Depth, and Egomotion Supplemental Analysis of Timestamp Loss In this section, we will further discuss the choice of our loss function, which minimizes the sum of squares of the average timestamp at each pixel, over the contrast maximization loss proposed by Gallego et al. [4].

The contrast maximization cost generates an event image, where each pixel's value corresponds to the number of events at that pixel after some warping. The goal, then, is to maximize the variance in this event image, H:

$$\mathcal{L}_{contrast} = \frac{1}{N_p} \sum_{i,j} (h_{ij} - \mu_H)^2$$

where $\mu_H$ is the mean of the event image.

The intention behind this loss function is that, when the events are correctly deblurred, the sharpness in the image should be maximized. This loss facilitates the maximization in the sharpness of the image by encouraging each pixel to either have very high or very low event counts.

It can be seen that the average timestamp loss operates in a similar fashion. The averaging operation means that the loss will always be reduced when events over two pixels are warped to a single pixel (as one goes to 0, and the other goes to the mean of the two timestamps), and, as a result, the loss also reduces with the number of pixels with events.

Figure 9:
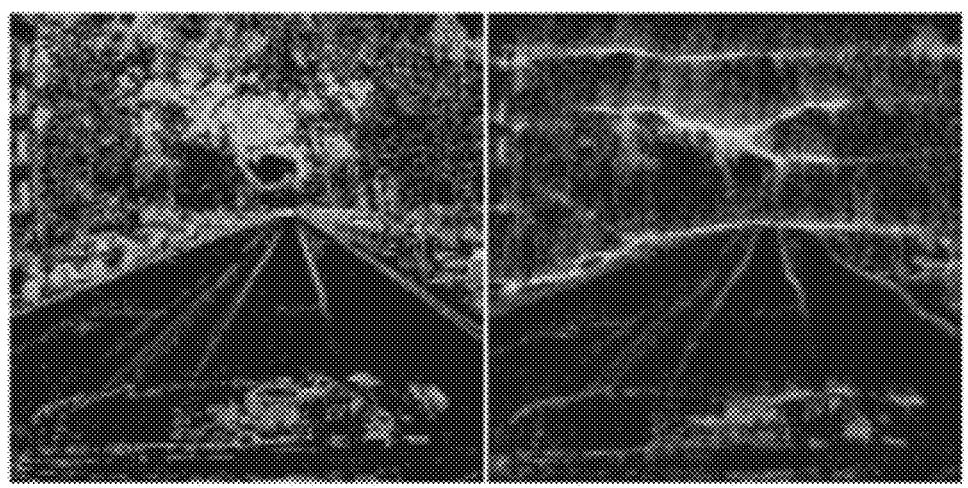
FIG. 9 illustrates images of overfitting when training with the contrast maximization loss. The flow from the network warps all of the events onto a small subset of lines in the image.

However, in our experiments, we found that the contrast maximization loss was unconstrained and allowed the neural network to overfit this loss. This overfitting can be seen in FIG. 9, where the network has predicted flow that warps the events to a much smaller subset of lines that the true values. Unfortunately, the smoothness regularization was unable to help this issue, due to the robust Charbonnier loss applied to the smoothness term. Due to the robust nature of the loss, some discontinuities are allowed in the flow, which are observed in FIG. 9, where the flow on either side of the line is smooth, and there is a flip in direction across each line.

The timestamps provide additional information about the data association between different events, which allows the average timestamp loss to avoid this overfitting. If we assume that a point in the image will generate events with evenly spaced timestamps throughout the temporal window, then barring occlusion effects, every event near the end of the window should have data associations with some events at the beginning of the window. On the contrary, it is unlikely that two events with very similar timestamps should be associated. The data association is captured by this loss, as, given an event with a high-frequency timestamp t, and a set of pixels with events $\{t_4\}$ to map to, the loss $((t-t_4)/2)^2$ is minimized when $t-t_4$ is maximized. that is, the loss encourages events with different timestamps to be associated together, while discouraging association between events with similar timestamps. This allows the network to avoid the local minima encountered with the contrast maximization loss.

It is possible that the contrast maximization loss may work with some tuning/modification of the smoothness loss. However, satisfactory results were not achieved experimentally.

EV-FlowNet: Self-Supervised Optical Flow Estimation for Event-Based Cameras

Event-based cameras have shown great promise in a variety of situations where frame-based cameras suffer, such as high speed motions and high dynamic range scenes. However, developing algorithms for event measurements requires a new class of hand crafted algorithms. Deep learning has shown great success in providing model free solutions to many problems in the vision community, but existing networks have been developed with frame-based images in mind, and there does not exist the wealth of labeled data for events as there does for images for supervised training. To these points, we present EV-FlowNet, a novel self-supervised deep learning pipeline for optical flow estimation for event-based cameras. In particular, we introduce an image-based representation of a given event stream, which is fed into a self-supervised neural network as the sole input. The corresponding grayscale images captured from the same camera at the same time as the events are then used as a supervisory signal to provide a loss function at training time, given the estimated flow from the network. We show that the resulting network is able to accurately predict optical flow from events only in a variety of different scenes, with performance competitive to image-based networks. This method not only allows for accurate estimation of dense optical flow, but also provides a framework for the transfer of other self-supervised methods to the event-based domain.

I. INTRODUCTION

By registering changes in log intensity in the image with microsecond accuracy, event-based cameras offer promising advantages over frame-based cameras in situations with factors such as high speed motions and difficult lighting. One interesting application of these cameras is the estimation of optical flow. By directly measuring the precise time at which each pixel changes, the event stream directly encodes fine grain motion information, which researchers have taken advantage of in order to perform optical flow estimation. For example, Benosman et al. [30] show that optical flow can be estimated from a local window around each event in a linear fashion, by estimating a plane in the spatio-temporal domain. This is significantly simpler than image-based methods, where optical flow is performed using iterative methods. However, analysis in Rueckauer and Delbruck [48] has shown that these algorithms require significant, hand crafted outlier rejection schemes, as they do not properly model the output of the sensor.

For traditional image-based methods, deep learning has helped the computer vision community achieve new levels of performance while avoiding having to explicitly model the entire problem. However, these techniques have yet to see the same level of adoption and success for event-based cameras. One reason for this is the asynchronous output of the even-based camera, which does not easily fit into the synchronous, frame-based inputs expected by image-based paradigms. Another reason is the lack of labeled training data necessary for supervised training methods. In this work, we propose two main contributions to resolve these issues.

First, we propose a novel image-based representation of an event stream, which fits into any standard image-based neural network architecture. The event stream is summarized by an image with channels representing the number of events and the latest timestamp at each polarity at each pixel. This compact representation preserves the spatial relationships between events, while maintaining the most recent temporal information at each pixel and providing a fixed number of channels for any event stream.

Second, we present a self-supervised learning method for optical flow estimation given only a set of events and the corresponding grayscale images generated from the same camera. The self-supervised loss is modeled after frame-based self-supervised flow networks such as Yu et al. [50] and Meister et al. [12], where a photometric loss is used as a supervisory signal in place of direct supervision. As a result, the network can be trained using only data captured directly from an event camera that also generates frame-based images, such as the Dynamic and Active-pixel Vision (DAVIS) Sensor developed by Brandli et al. [32], circumventing the need for expensive labeling of data.

These event images combined with the self-supervised loss are sufficient for the network to learn to predict accurate optical flow from events alone. For evaluation, we generate a new event camera optical flow dataset, using the ground truth depths and poses in the Multi Vehicle Event Camera Dataset by Zhu et al. [51]. We show that our method is competitive on this dataset with UnFlow by Meister et al. [12], an image-based self-supervised network trained on KITTI, and fine tuned on event camera frames, as well as standard non-learning based optical flow methods.

In summary, our main contributions in this work are:
  We introduce a novel method for learning optical flow using events as inputs only, without any supervision from ground-truth flow.
  Our CNN architecture uses a self-supervised photoconsistency loss from low resolution intensity images used in training only.
  We present a novel event-based optical flow dataset with ground truth optical flow, on which we evaluate our method against a state of the art frame-based method.

Figure 10:
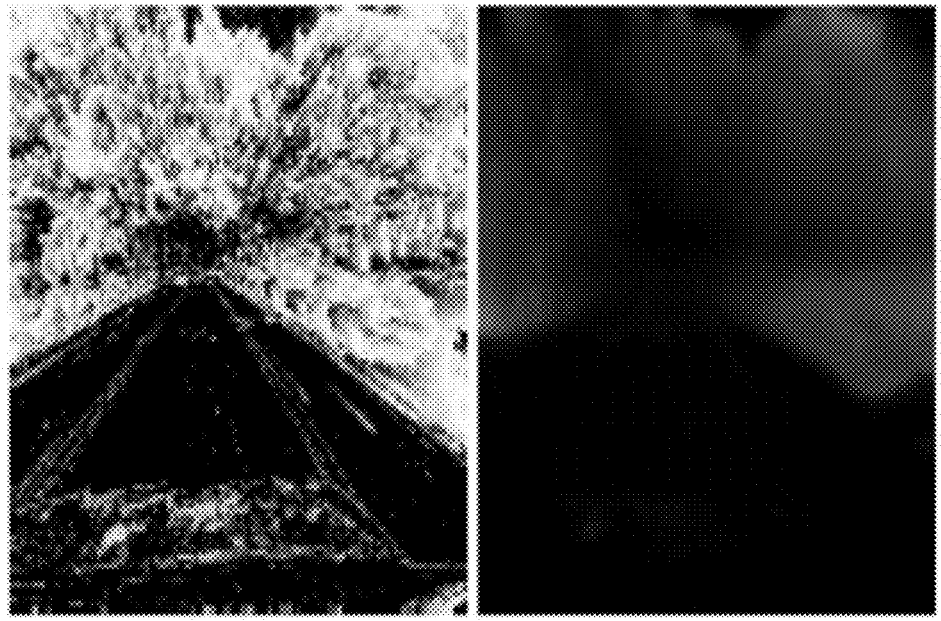
FIG. 10 (left image) illustrates event-based input to a convolutional neural network.

FIG. 10 illustrates Left: Event input to the network visualizing the last two channels (latest timestamps). Right: Predicted flow, colored by direction.

II. RELATED WORK

A. Event-Based Optical Flow

There have been several works that attempt to take advantage of the high temporal resolution of the event camera to estimate accurate optical flow. Benosman et al. [30] model a given patch moving in the spatial temporal domain as a plane and estimate optical flow as the slope of this plane. This work is extended in Benosman et al. [2] by adding an iterative outlier rejection scheme to remove events significantly far from the plane, and in Barranco et al. [28] by combining the estimated flow with flow from traditional images. Brosch et al. [33] present an analogy of Lucas et al. [39] using the events to approximate the spatial image gradient, while Orchard and Etienne-Cummings [43] use a spiking neural network to estimate flow, and Liu and Delbruck [38] estimate sparse flow using an adaptive block matching algorithm. In other works, Bardow et al. [1] present the optical flow estimation problem jointly with image reconstruction, and solve the joint problem using convex optimization methods, while Zhu et al. [51] present an expectation-maximization based approach to estimate flow in a local patch. A number of these methods have been evaluated in Rueckauer and Delbruck [48] against relatively simple scenes with limited translation and rotation, with limited results, with ground truth optical flow estimated from a gyroscope. Similarly, Barranco et al. [29] provide a dataset with optical flow generated from a known motion combined with depths from an RGB-D sensor.

B. Event-Based Deep Learning

One of the main challenges for supervised learning for events is the lack of labeled data. As a result, many of the early works on learning with event-based data, such as Ghosh et al. [34] and Moeys et al. [14], rely on small, hand collected datasets.

To address this, recent works have attempted to collect new datasets of event camera data. Mueggler et al. [40], provide handheld sequences with ground truth camera pose, which Nguyen et al. [42] use to train a LSTM network to predict camera pose. In addition, Zhu et al. [52] provide flying, driving and handheld sequences with ground truth camera pose and depth maps, and Binas et al. [31] provide long driving sequences with ground truth measurements from the vehicle such as steering angle and GPS position.

Another approach has been to generate event-based equivalents of existing image-based datasets by recording images from these datasets from an event-based camera (Orchard et al. [44], Hu et al. [35]).

Recently, there have also been implementations of neural networks on spiking neuromorphic processors, such as in Amir et al. [27], where a network is adapted to the TrueNorth chip to perform gesture recognition.

C. Self-Supervised Optical Flow

Self-supervised, or unsupervised, methods have shown great promise in training networks to solve many challenging 3D perception problems. Yu et al. [50] and Ren et al. [46] train an optical flow prediction network using the traditional brightness constancy and smoothness constraints developed in optimization based methods such as the Lucas Kanade method Lucas et al. [39]. Zhu et al. [55] combine this self-supervised loss with supervision from an optimization based flow estimate as a proxy for ground truth supervision, while Meister et al. [12] extend the loss with occlusion masks and a second order smoothness term, and Lai et al. [37] introduce an adversarial loss on top of the photometric error.

III. METHOD

In this section, we describe our approach in detail. In Sec. III-A, we describe our event representation, which is an analogy to an event image. In Sec. III-B, we describe the self-supervised loss used to provide a supervisory signal using only the gray scale images captured before and after each time window, and in Sec. III-C, we describe the architecture of our network, which takes as input the event image and outputs a pixel-wise optical flow. Note that, throughout this paper, we refer to optical flow as the displacement of each pixel within a given time window.

A. Event Representation

An event-based camera tracks changes in the log intensity of an image, and returns an event whenever the log intensity changes over a set threshold θ:

$$\log(I_{t+1}) - \log(I_t) \geq \theta \quad (15)$$

Each event contains the pixel location of the change, timestamp of the event and polarity:

$$e = \{x, t, p\} \quad (16)$$

Because of the asynchronous nature of the events, it is not immediately clear what representation of the events should be used in the standard convolutional neural network architecture. Most modern network architectures expect image-like inputs, with a fixed, relatively low, number of channels (recurrent networks excluded) and spatial correlations between neighboring pixels. Therefore, a good representation is key to fully take advantage of existing networks while summarizing the necessary information from the event stream.

Perhaps the most complete representation that preserves all of the information in each event would be to represent the events as a n×4 matrix, where each column contains the information of a single event. However, this does not directly encode the spatial relationships between events that is typically exploited by convolutions over images.

In this work, we chose to instead use a representation of the events in image form. The input to the network is a 4 channel image with the same resolution as the camera.

The first two channels encode the number of positive and negative events that have occurred at each pixel, respectively. This counting of events is a common method for visualizing the event stream and has been shown in Nguyen et al. [42] to be informative in a learning based framework to regress 6dof pose.

Figure 11:
FIG. 11 (left image) illustrates a grayscale image of a scene.

However, the number of events alone discards valuable information in the timestamps that encode information about the motion in the image. Incorporating timestamps in image form is a challenging task. One possible solution would be to have k channels, where k is the most events in any pixel in the image and stack all incoming timestamps. However, this would result in a large increase in the dimensionality of the input. Instead, we encode the pixels in the last two channels as the timestamp of the most recent positive and negative event at that pixel, respectively. This is similar to the "Event-based Time Surfaces" used in Lagorce et al. [36] and the "timestamp images" used in Park et al. [45]. An example of this kind of image can be found in FIG. 11, where we can see that the flow is evident by following the gradient in the image, particularly for closer (faster moving) objects. FIG. 11 illustrates an example of a timestamp image. Left: Grayscale output. Right: Timestamp image, where each pixel represents the timestamp of the most recent event. Brighter is more recent. While this representation inherently discards all of the timestamps but the most recent at each pixel, we have observed that this representation is sufficient for the network to estimate the correct flow in most regions. One deficiency of this representation is that areas with very dense events and large motion will have all pixels overridden by very recent events with very similar timestamps. However, this problem can be avoided by choosing smaller time windows, thereby reducing the magnitude of the motion.

In addition, we normalize the timestamp images by the size of the time window for the image, so that the maximum value in the last two channels is 1. This has the effect of both scaling the timestamps to be on the same order of magnitude as the event counts and ensuring that fast motions with a small time window and slow motions with a large time window that generate similar displacements have similar inputs to the network.

B. Self-Supervised Loss

Due to the fact that there is a relatively small amount of labeled data for event-based cameras as compared to traditional cameras, it is difficult to generate a sufficient dataset for a supervised learning method. Instead, we utilize the fact that the DAVIS camera generates synchronized events and grayscale images to perform self-supervised learning using the grayscale images in the loss. At training time, the network is provided with the event timestamp images, as well as a pair of grayscale images, occurring immediately before and after the event time window. Only the event timestamp images are passed into the network, which predicts a per pixel flow. The grayscale images are then used to apply a loss over the predicted flow in a self-supervised manner.

The overall loss function used follows traditional variational methods for estimating optical flow and consists of a photometric and a smoothness loss.

To compute the photometric loss, the flow is used to warp the second image to the first image using bilinear sampling, as described in Yu et al. [50]. The photometric loss, then, aims to minimize the difference in intensity between the warped second image and the first image:

$$\ell_{photometric}(u, v; I_t, I_{t+1}) = \sum_{x,y} \rho(I_t(x, y) - I_{t+1}(x + u(x, y), y + v(x, y))) \quad (17)$$

where ρ the Charbonnier loss function, a common loss in the optical flow literature used for outlier rejection (Sun et al.[49]):

$$\rho(x) = (x^2 + \epsilon^2)^\alpha \quad (18)$$

As we are using frame-based images for supervision, this method is susceptible to image-based issues such as the aperture problem. Thus, we follow the other works in the frame-based domain and apply a regularizer in the form of a smoothness loss. The smoothness loss aims to regularize the output flow by minimizing the difference in flow between neighboring pixels horizontally, vertically and diagonally.

$$\ell_{smoothness}(u, v) = \sum_{x,y} \sum_{i,j \in N(x,y)} \rho(u(x, y) - u(i, j)) + \rho(v(x, y) - v(i, j)) \quad (19)$$

where N is the set of neighbors around (x; y).

The total loss is the weighted sum of the photometric and smoothness losses:

$$L_{total} = \ell_{photometric} + \lambda \ell_{smoothness} \quad (20)$$

C. Network Architecture

Figure 12:
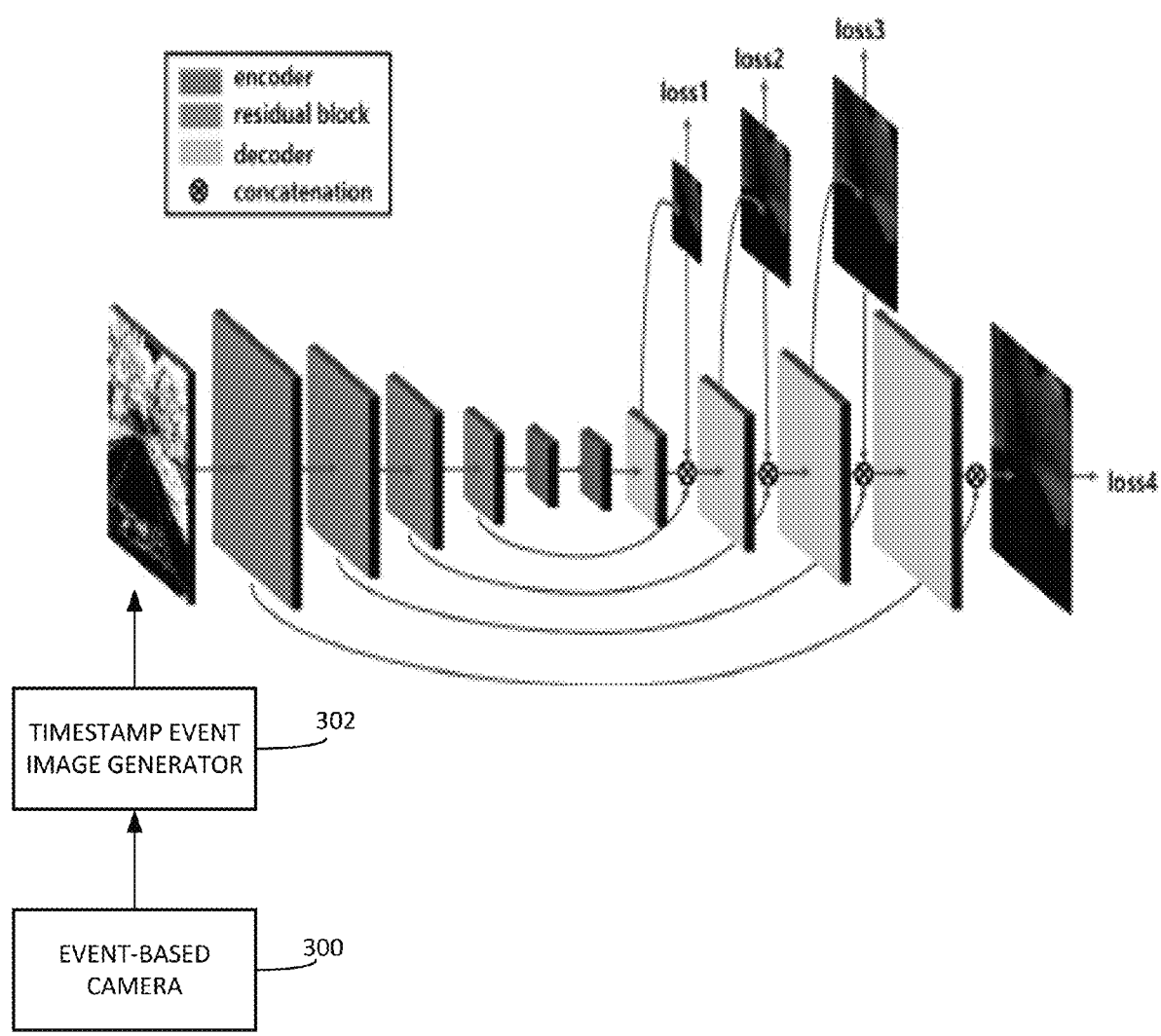
FIG. 12 is a diagram illustrating a convolutional neural network configured to generate optical flow based on timestamp event images and event-based camera images as inputs.

The EV-FlowNet architecture very closely resembles the encoder-decoder networks such as the stacked hourglass (Newell et al. [41]) and the U-Net (Ronneberger et al. [47]) and is illustrated in FIG. 12. The input event image is downsampled as it is passed through 4 strided convolution layers, with output channels doubling each time. The resulting activations are passed through 2 residual blocks, and then four upsample convolution layers, where the activations are upsampled using nearest neighbor resampling and then convolved, to obtain a final flow estimate. At each upsample convolution layer, there is also a skip connection from the corresponding strided convolution layer, as well as another convolution layer to produce an intermediate, lower resolution, flow estimate, which is concatenated with the activations from the upsample convolution. The loss in $$L_{total} = \ell_{photometric} + \lambda \ell_{smoothness} \quad (20)$$

is then applied to each intermediate flow by downsampling the grayscale images. The tan h function is used as the activation function for all of the flow predictions.

The inputs to the network are timestamp event images generated by timestamp event image generator 302 based on event-based camera images generated by event-based camera 300.

IV. OPTICAL FLOW DATASET

For ground truth evaluation only, we generated a novel dataset for ground truth optical flow using the data provided in the Multi-Vehicle Stereo Event Camera dataset (MVSEC) by Zhu et al. [52]. The dataset contains stereo event camera data in a number of flying, driving and handheld scenes.

In addition, the dataset provides ground truth poses and depths maps for each event camera, which we have used to generate reference ground truth optical flow.

From the pose (consisting of rotation R and translation p) of the camera at time $t_0$ and $t_1$, we make a linear velocity assumption, and estimate velocity and angular velocity using numerical differentiation:

$$v = \frac{(p(t_1) - p(t_0))}{dt} \quad (21)$$

$$\omega^{\wedge} = \frac{\log m(R_{t_0}^T R_{t_1})}{dt} \quad (22)$$

where log m is the matrix logarithm, and $\omega^{\wedge}$ converts the vector w into the corresponding skew symmetric matrix:

$$\omega^{\wedge} = \begin{bmatrix} 0 & -\omega_z & \omega_y \\ \omega_z & 0 & -\omega_x \\ -\omega_y & \omega_x & 0 \end{bmatrix} \quad (23)$$

A central moving average filter is applied to the estimated velocities to reduce noise. We then use these velocities to estimate the motion field, given the ground truth depths, Z, at each undistorted pixel position:

$$\begin{pmatrix} \dot{x} \\ \dot{y} \end{pmatrix} = \begin{bmatrix} -\frac{1}{Z} & 0 & -\frac{x}{Z} & xy & -(1+x^2) & y \\ 0 & -\frac{1}{Z} & \frac{y}{Z} & 1+y^2 & -xy & -x \end{bmatrix} \begin{pmatrix} v \\ \omega \end{pmatrix} \quad (24)$$

Finally, we scale the motion field by the time window between each pair of images dt and use the resulting displacement as an approximation to the true optical flow for each pixel. To apply the ground truth to the distorted images, we shift the undistorted pixels by the flow, and apply distortion to the shifted pixels. The distorted flow is, then, the displacement from the original distorted position to the shifted distorted position.

In total, we have generated ground truth optical flow for the indoor_flying, outdoor_day and outdoor_night sequences. In addition to using the indoor_flying and outdoor_day ground truth sets for evaluation, we will also release all sequences as a dataset.

V. EMPIRICAL EVALUATION

A. Training Details

Two networks were trained on the two outdoor day sequences from MVSEC. Outdoor_day1 contains roughly 12000 images, and outdoor_day2 contains roughly 26000 images. The images are captured from driving in an industrial complex and public roads, respectively, where the two scenes are visually very different. The motions include mostly straights and turns, with occasional independently moving objects such as other cars and pedestrians. The input images are cropped to 256×256, the number of output channels at the first encoder layer is 64 and the number of output channels in each residual block is 512.

To increase the variation in the magnitude of the optical flow seen at training, we randomly select images up to k images apart in time, and all of the events that occurred between those images. In our experiments, k ∈[2, 4, 6, 8, 10, 12]. In addition, we randomly flip the inputs horizontally, and randomly crop them to achieve the desired resolution.

The weight on the smoothness loss $L_{total} = \ell_{photometric} + \lambda \ell_{smoothness}$, $\lambda$, is set to 0.5. Each of the intermediate losses is weighted equally in the final loss. For the Charbonnier loss $\rho(x) = (x^2 + \epsilon^2)^{\alpha}$, $\alpha$ was set to be 0.45 and $\epsilon$ was set to be 1 e-3. The Adam optimizer is used, with learning rate initialized at 1e-5, and exponentially decayed every 4 epochs by 0.8. The model is trained for 300,000 iterations and takes around 12 hours to train on a 16 GB NVIDIA Tesla V100.

B. Ablation Studies

In addition to the described architecture (denoted EVFlowNet2R), we also train three other networks to test the effects of varying the input to the network, as well as increasing the capacity of the network.

To test the contribution of each of the channels in the input, we train two additional networks, one with only the event counts (first two channels) as input (denoted EV-FlowNet$_c$), and one with only the event timestamps (last two channels) as input (denoted EV-FlowNet$_R$).

In addition, we tested different network capacities by training a larger model with 4 residual blocks (denoted EVFlowNet$_{4R}$). A single forward pass takes, on average, 40 ms for the smaller network, and 48 ms for the larger network, when run on a NVIDIA GeForce GTX 1050, a laptop grade GPU.

C. Comparisons

To compare our results with other existing methods, we tested implementations of Event-based Visual Flow by Benosman et al. [2], an optimization based method that works on events, and UnFlow by Meister et al. [12], a self-supervised method that works on traditional frames.

As there is no open source code by the authors of Event-based Visual Flow, we designed an implementation around the method described in Rueckauer and Delbruck [48]. In particular, we implemented the robust Local Plane Fit algorithm, with a spatial window of 5×5 pixels, vanishing gradient threshold th3 of 1e-3, and outlier distance threshold of 1e-2. However, we were unable to achieve any reasonable results on the datasets, with only very few points returning valid flow values (<5%), and none of the valid flow values being visually correct. For validation, we also tested the open source MATLAB code provided by the authors of Mueggler et al. [18], where we received similar results. As a result, we believe that the method was unable to generalize to the natural scenes in the test set, and so did not include the results in this paper.

For UnFlow, we used the unsupervised model trained on KITTI raw, and fine-tuned on outdoor_day2. This model was able to produce reasonable results Table 1.

D. Test Sequences

For comparison against UnFlow, we evaluated 800 frames from the outdoor_day1 sequence as well as sequences 1 to 3 from indoor_flying. For the event input, we used all of the events that occurred in between the two input frames.

The outdoor_day1 sequence spans between 222.4s and 240.4s. This section was chosen as the grayscale images were consistently bright, and there is minimal shaking of the camera (the provided poses are smoothed and do not capture shaking of the camera if the vehicle hits a bump in the road). In order to avoid conflicts between training and testing data, a model trained only using data from outdoor_day2 was used, which is visually significantly different from outdoor_day1.

The three indoor_flying sequences total roughly 240s, and feature a significantly different indoor scene, containing vertical and backward motions, which were previously unseen in the driving scenes. A model trained on both outdoor_day1 and outdoor_day2 data was used for evaluation on these sequences. We avoided fine tuning on the flying sequences, as the sequences are in one room, and all relatively similar in visual appearance. As a result, it would be very easy for a network to overfit the environment. Sequence 4 was omitted as the majority of the view was just the floor, and so had a relatively small amount of useful data for evaluation.

E. Metrics

For each method and sequence, we compute the average endpoint error (AEE), defined as the distance between the endpoints of the predicted and ground truth flow vectors:

$$AEE = \sum_{x,y} \left\| \begin{pmatrix} u(x,y)_{pred} \\ v(x,y)_{pred} \end{pmatrix} - \begin{pmatrix} u(x,y)_{gt} \\ v(x,y)_{gt} \end{pmatrix} \right\|_2 \quad (25)$$

In addition, we follow the KITTI flow 2015 benchmark and report the percentage of points with EE greater than 3 pixels and 5% of the magnitude of the flow vector. Similar to KITTI, 3 pixels is roughly the maximum error observed when warping the grayscale images according to the ground truth flow and comparing against the next image.

However, as the input event image is relatively sparse, the network only returns accurate flow on points with events. As a result, we limit the computation of AEE to pixels in which at least one event was observed. For consistency, this is done with a mask applied to the EE for both event-based and frame-based methods. We also mask out any points for which we have no ground truth flow (i.e. regions with no ground truth depth). In practice, this results in the error being computed over 20-30% of the pixels in each image.

In order to vary the magnitude of flow observed for each test, we run two evaluations per sequence: one with input frames and corresponding events that are one frame apart, and one with frames and events four frames apart. We outline the results in Table I.

TABLE I

Quantitative evaluation of each model on the MVSEC optical flow ground truth. Average end-point error (AEE) and percentage of pixels with EE above 3 and 5% of the magnitude of the flow vector(% Outlier) are presented for each method (lower is better for both), with evaluation run with image pairs 1 frame apart (top) and 4 frames apart (bottom). The EV-FlowNet methods are: Counts only (EV-FlowNet$_C$), Timestamps only (EV-FlowNet$_T$), 2 Residual blocks (EV-FlowNet$_{2R}$) and 4 Residual blocks (EV-FlowNet$_{4R}$).

| dt = 1 frame | outdoor driving | | indoor flying1 | | indoor flying2 | | indoor flying3 | |
|---|---|---|---|---|---|---|---|---|
| | AEE | % Outlier | AEE | % Outlier | AEE | % Outlier | AEE | % Outlier |
| UnFlow | 0.97 | 1.6 | 0.50 | 0.1 | 11.70 | 1.0 | 0.55 | 0.0 |
| EV-FlowNet$_C$ | 0.49 | 0.2 | 1.30 | 6.8 | 2.34 | 25.9 | 2.06 | 22.2 |
| EV-FlowNet$_T$ | 0.52 | 0.2 | 1.20 | 4.5 | 2.15 | 22.6 | 1.91 | 19.8 |
| EV-FlowNet$_{2R}$ | 0.49 | 0.2 | 1.03 | 2.2 | 1.72 | 15.1 | 1.53 | 11.9 |
| EV-FlowNet$_{4R}$ | 0.49 | 0.2 | 1.14 | 3.5 | 2.10 | 21.0 | 1.85 | 18.8 |

| dt = 4 frames | outdoor driving | | indoor flying1 | | indoor flying2 | | indoor flying3 | |
|---|---|---|---|---|---|---|---|---|
| | AEE | % Outlier | AEE | % Outlier | AEE | % Outlier | AEE | % Outlier |
| UnFlow | 2.95 | 40.0 | 3.81 | 56.1 | 6.22 | 79.5 | 1.96 | 18.2 |
| EV-FlowNet$_C$ | 1.41 | 10.8 | 3.22 | 41.4 | 5.30 | 60.1 | 4.68 | 57.0 |
| EV-FlowNet$_T$ | 1.34 | 8.4 | 2.53 | 33.7 | 4.40 | 51.9 | 3.91 | 47.1 |
| EV-FlowNet$_{2R}$ | 1.23 | 7.3 | 2.25 | 24.7 | 4.05 | 45.3 | 3.45 | 39.7 |
| EV-FlowNet$_{4R}$ | 1.33 | 9.4 | 2.75 | 33.5 | 4.82 | 53.3 | 4.30 | 47.8 |

F. Results

Figure 13:
FIG. 13 is a collection of images, where each row of images includes a grayscale image, an event timestamp image, a ground truth optical flow image, an UnFlow predicted optical flow image, and a predicted optical flow image generated using the subject matter described herein.

1) Qualitative Results: In addition to the quantitative analysis provided, we provide qualitative results in FIG. 13. In FIG. 13, examples were collected from outdoor_day1, outdoor_day1, indoor flying1 and indoor flying2, in that order. In these results, and throughout the test set, the predicted flow always closely follows the ground truth. As the event input is quite sparse, our network tends to predict zero flow in areas without events. This is consistent with the photometric loss, as areas without events are typically low texture areas, where there is little change in intensity within each pixel neighborhood. In practice, the useful flow can be extracted by only using flow predictions at points with events. On the other hand, while UnFlow typically performs reasonably on the high texture regions, the results on low texture regions are very noisy.

Figure 14:
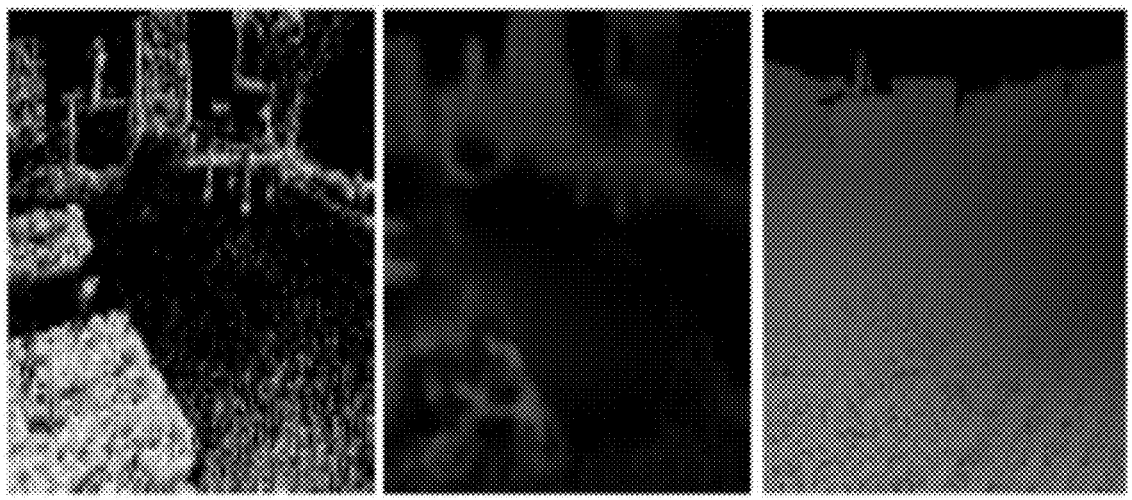
FIG. 14 illustrates a grayscale image, an timestamp image, and an image of predicted optical flow.

2) Ablation Study Results: From the results of the ablation studies in Table I, EV-FlowNetc (counts only) performed the worst. This aligns with our intuition, as the only information attainable from the counts is from motion blur effects, which is a weak signal on its own. EV-FlowNet$_T$ (timestamps only) performs better for most tests, as the timestamps carry information about the ordering between neighboring events, as well as the magnitude of the velocity. However, the timestamp only network fails when there is significant noise in the image, or when fast motion results in more recent timestamps covering all of the older ones. This is illustrated in FIG. 14, where even the full network struggles to predict the flow in a region dominated by recent timestamps. Overall, the combined models clearly perform better, likely as the event counts carry information about the importance of each pixel. Pixels with few events are likely to be just noise, while pixels with many events are more likely to carry useful information. Somewhat surprisingly, the larger network, EV-FlowNet$_{4R}$ actually performs worse than the smaller one, EV-FlowNet$_{2R}$. A possible explanation is that the larger capacity network learned to overfit the training sets, and so did not generalize as well to the test sets, which were significantly different. For extra validation, both EVFlowNet$_{2R}$ and EV-FlowNet$_{4R}$ were trained for an additional 200,000 iterations, with no appreciable improvements. It is likely, however, that, given more data, the larger model would perform better.

3) Comparison Results: From our experiments, we found that the UnFlow network tends to predict roughly correct flows for most inputs but tends to be very noisy in low texture areas of the image. The sparse nature of the events is a benefit in these regions, as the lack of events there would cause the network to predict no flow, instead of an incorrect output. In general, EV-FlowNet performed better on the dt=4 tests, while worse on the dt=1 tests (with the exception of outdoor driving1 and indoor flying3). We observed that UnFlow typically performed better in situations with very small or very large motion. In these situations, there are either few events as input, or so many events that the image is overridden by recent timestamps. However, this is a problem intrinsic to the testing process, as the time window is defined by the image frame rate. In practice, these problems can be avoided by choosing time windows large enough so that sufficient information is available while avoiding saturating the event image. One possible solution to this would be to have a fixed number of events in the window each time.

VI. CONCLUSION

In this work, we have presented a novel design for a neural network architecture that is able to accurately predict optical flow from events alone. Due to the method's self-supervised nature, the network can be trained without any We show that the predictions generalize beyond hand designed laboratory scenes to natural ones, and that the method is competitive with state of the art frame-based self-supervised methods. We hope that this work will provide not only a novel method for flow estimation, but also a paradigm for applying other self-supervised learning methods to event cameras in the future. For future work, we hope to incorporate additional losses that provide supervisory signals from event data alone, to expose the network to scenes that are challenging for traditional frame-based cameras, such as those with high speed motions or challenging lighting.

VII. EXEMPLARY IMPLEMENTATION

Figure 15:
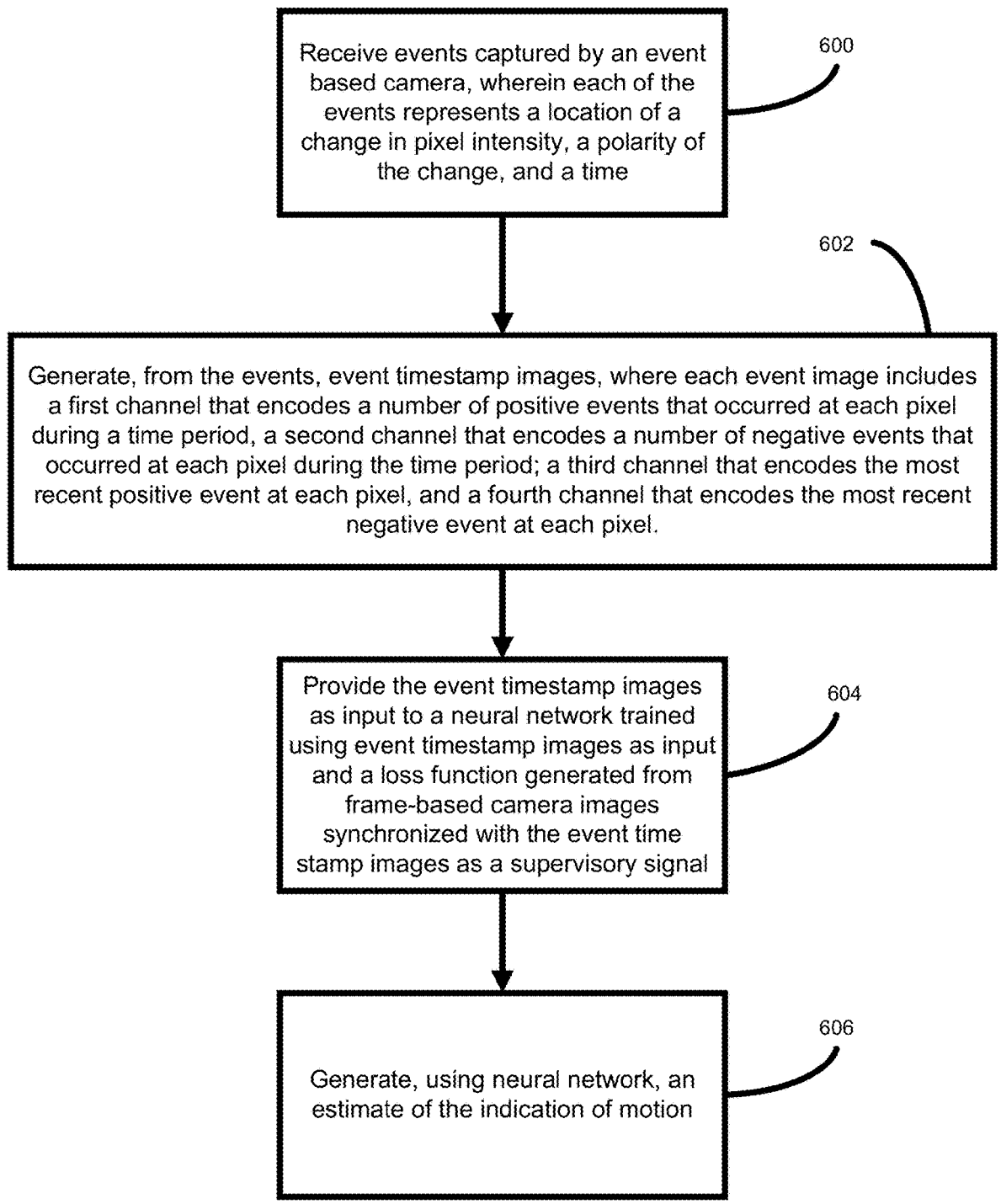
FIG. 15 is a flow chart illustrating an exemplary process for predicting motion from timestamp event images.

FIG. 15 is a flow chart illustrating a method for prediction of an indication of motion using input from an event-based camera. Referring to FIG. 15, in step 600, the method includes receiving events captured by an event-based camera, wherein each of the events represents a location of a change in pixel intensity, a polarity of the change, and a time. For example, event-based camera 300 illustrated in FIG. 12 may capture events as the camera moves through a region.

In step 602, the method further includes generating, from the events, event timestamp images, where each event image includes a first channel that encodes a number of positive events that occurred at each pixel during a time period, a second channel that encodes a number of negative events that occurred at each pixel during the time period; a third channel that encodes the most recent positive event at each pixel, and a fourth channel that encodes the most recent negative event at each pixel. For example, timestamp event image generator 302 illustrated in FIG. 12 may generate timestamp event images as described above.

In step 604, the method further includes providing the timestamp event images as input to a neural network trained using event timestamp images as input and a loss function generated from frame-based camera images synchronized with the event timestamp images as a supervisory signal. For example, timestamp event image generator 302 may provide timestamp event images as input to the highest resolution encoder stage of the neural network illustrated in FIG. 12. The neural network was trained during the training phase using grayscale frame-based camera images synchronized with the timestamp event images.

In step 606, the method further includes generating, using the neural network, an estimate of the indication of motion. After the neural network illustrated in FIG. 12 is trained, the output generated by the last decoder stages is a prediction of optical flow. The optical flow may be used in machine vision applications, such as motion estimation in unmanned aerial, land-based, and water-based vehicles.

The disclosure of each of the following references is hereby incorporated herein by reference in its entirety.

REFERENCES

[1] P. Bardow, A. J. Davison, and S. Leutenegger. Simultaneous optical flow and intensity estimation from an event camera. In Proceedings of the IEEE Conference on Computer Vision and Pattern Recognition, pages 884-892, 2016.

[2] R. Benosman, C. Clercq, X. Lagorce, S.-H. Ieng, and C. Bartolozzi Event-based visual flow. IEEE transactions on neural networks and learning systems, 25(2):407-417, 2014.

[3] P. Charbonnier, L. Blanc-F'eraud, G. Aubert, and M. Barlaud. Two deterministic half-quadratic regularization algorithms for computed imaging. In Image Processing, 1994. Proceedings. ICIP-94., IEEE International Conference, volume 2, pages 168-172. IEEE, 1994.

[4] G. Gallego, H. Rebecq, and D. Scaramuzza. A unifying contrast maximization framework for event cameras, with applications to motion, depth, and optical flow estimation.

[5] G. Gallego and D. Scaramuzza. Accurate angular velocity estimation with an event camera. IEEE Robotics and Automation Letters, 2(2):632-639, 2017.

[6] C. Godard, O. Mac Aodha, and G. J. Brostow. Unsupervised monocular depth estimation with left-right consistency. In CVPR, volume 2, page 7, 2017.

[7] M. Jaderberg, K. Simonyan, A. Zisserman, et al. Spatial transformer networks. In Advances in neural information processing systems, pages 2017-2025, 2015.

[8] J. J. Yu, A. W. Harley, and K. G. Derpanis. Back to basics: Unsupervised learning of optical flow via brightness constancy and motion smoothness. In European Conference on Computer Vision, pages 3-10. Springer, 2016.

[9] H. Kim, S. Leutenegger, and A. J. Davison. Real-time 3d reconstruction and 6-dof tracking with an event camera. In European Conference on Computer Vision, pages 349-364. Springer, 2016.

[10] P. Lichtsteiner, C. Posch, and T. Delbruck. A 128×128 120 db 15 µs latency asynchronous temporal contrast vision sensor. IEEE journal of solid-state circuits, 43(2): 566-576, 2008.

[11] A. I. Maqueda, A. Loquercio, G. Gallego, N. Garcia, and D. Scaramuzza. Event-based vision meets deep learning on steering prediction for self-driving cars.

[12] S. Meister, J. Hur, and S. Roth. Unflow: Unsupervised learning of optical flow with a bidirectional census loss. arXivpreprint arXiv:1711.07837, 2017. 6

[13] A. Mitrokhin, C. Fermuller, C. Parameshwara, and Y. Aloimonos. Event-based moving object detection and tracking. arXiv preprint arXiv:1803.04523, 2018.

[14] D. P. Moeys, F. Corradi, E. Kerr, P. Vance, G. Das, D. Neil, D. Kerr, and T. Delbruck. Steering a predator robot using a mixed frame/event-driven convolutional neural network. In Event-based Control, Communication, and Signal Processing (EBCCSP), 2016 Second International Conference on, pages 1-8. IEEE, 2016.

[15] H. Rebecq, T. Horstschaefer, and D. Scaramuzza. Real-time visual inertial odometry for event cameras using keyframe based nonlinear optimization. 2017.

[16] F. Stein. Efficient computation of optical flow using the census transform. In Joint Pattern Recognition Symposium, pages 79-86. Springer, 2004.

[17] S. Vijayanarasimhan, S. Ricco, C. Schmid, R. Sukthankar, and K. Fragkiadaki. Sfm-net: Learning of structure and motion from video. arXiv preprint arXiv: 1704.07804, 2017.

[18] R. Wang, J.-M. Frahm, and S. M. Pizer. Recurrent neural network for learning dense depth and ego-motion from video. arXiv preprint arXiv:1805.06558, 2018.

[19] C. Ye, A. Mitrokhin, C. Parameshwara, C. Fermüller, J. A. Yorke, and Y. Aloimonos. Unsupervised learning of dense optical flow and depth from sparse event data. arXiv preprint arXiv:1809.08625, 2018.

[20] R. Zabih and J. Woodfill. Non-parametric local transforms for computing visual correspondence. In European conference on computer vision, pages 151-158. Springer, 1994.

[21] H. Zhan, R. Garg, C. S. Weerasekera, K. Li, H. Agarwal, and I. Reid. Unsupervised learning of monocular depth estimation and visual odometry with deep feature reconstruction. In Proceedings of the IEEE Conference on Computer Vision and Pattern Recognition, pages 340-349, 2018.

[22] T. Zhou, M. Brown, N. Snavely, and D. G. Lowe. Unsupervised learning of depth and ego-motion from video. In CVPR, volume 2, page 7, 2017.

[23] A. Z. Zhu, N. Atanasov, and K. Daniilidis. Event-based visual inertial odometry. In Proceedings of the IEEE Conference on Computer Vision and Pattern Recognition, pages 5391-5399, 2017.

[24] A. Z. Zhu, Y. Chen, and K. Daniilidis. Realtime time synchronized event-based stereo. arXiv preprint arXiv: 1803.09025, 2018.

[25] A. Z. Zhu, D. Thakur, T. Ozaslan, B. Pfrommer, V. Kumar, and K. Daniilidis. The multi vehicle stereo event camera dataset: An event camera dataset for 3d perception. IEEE Robotics and Automation Letters, 3(3):2032-2039, 2018. 2, 6

[26] A. Z. Zhu, L. Yuan, K. Chaney, and K. Daniilidis. EV-FlowNet: Self-supervised optical flow estimation for event-based cameras. arXiv preprint arXiv:1802.06898, 2018.

[27] Arnon Amir, Brian Taba, David Berg, Timothy Melano, Jeffrey McKinstry, Carmelo Di Nolfo, Tapan Nayak, Alexander Andreopoulos, Guillaume Garreau, Marcela Mendoza, et al. A Low Power, Fully Event-Based Gesture Recognition System. In Proceedings of the IEEE Conference on Computer Vision and Pattern Recognition, pages 7243-7252, 2017.

[28] Francisco Barranco, Cornelia Fermuller, and Yiannis Aloimonos. Contour motion estimation for asynchronous event-driven cameras. Proceedings of the IEEE, 102(10): 1537-1556, 2014.

[29] Francisco Barranco, Cornelia Fermuller, Yiannis Aloimonos, and Tobi Delbruck. A dataset for visual navigation with neuromorphic methods. Frontiers in Neuroscience, 10:49, 2016.

[30] Ryad Benosman, Sio-Hoi Ieng, Charles Clercq, Chiara Bartolozzi, and Mandyam Srinivasan. Asynchronous frameless event-based optical flow. Neural Networks, 27: 32-37, 2012.

[31] Jonathan Binas, Daniel Neil, Shih-Chii Liu, and Tobi Delbruck. DDD17: End-To-End DAVIS Driving Dataset. CoRR, abs/1711.01458, 2017.

[32] Christian Brandli, Raphael Berner, Minhao Yang, Shih-Chii Liu, and Tobi Delbruck. A 240 180 130 db 3 s latency global shutter spatiotemporal vision sensor. IEEE Journal of Solid-State Circuits, 49(10):2333-2341, 2014.

[33] Tobias Brosch, Stephan Tschechne, and Heiko Neumann. On event-based optical flow detection. Frontiers in neuroscience, 9:137, 2015.

[34] Rohan Ghosh, Abhishek Mishra, Garrick Orchard, and Nitish V Thakor. Real-time object recognition and orientation estimation using an event-based camera and CNN. In Biomedical Circuits and Systems Conference (BioCAS), 2014 IEEE, pages 544-547. IEEE, 2014.

[35] Yuhuang Hu, Hongjie Liu, Michael Pfeiffer, and Tobi Delbruck. DVS benchmark datasets for object tracking, action recognition, and object recognition. Frontiers in Neuroscience, 10, 2016.

[36] Xavier Lagorce, Garrick Orchard, Francesco Galluppi, Bertram E Shi, and Ryad B Benosman. HOTS: a hierarchy of event-based time-surfaces for pattern recognition. IEEE Transactions on Pattern Analysis and Machine Intelligence, 39(7):1346-1359, 2017.

[37] Wei-Sheng Lai, Jia-Bin Huang, and Ming-Hsuan Yang. Semi-supervised learning for optical flow with generative adversarial networks. In Advances in Neural Information Processing Systems, pages 353-363, 2017.

[38] Min Liu and Tobi Delbruck. Abmof: A novel optical flow algorithm for dynamic vision sensors. arXiv preprint arXiv:1805.03988, 2018.

[39] Bruce D Lucas, Takeo Kanade, et al. An iterative image registration technique with an application to stereo vision. 1981.

[40] Elias Mueggler, Henri Rebecq, Guillermo Gallego, Tobi Delbruck, and Davide Scaramuzza. The event-camera dataset and simulator: Event-based data for pose estimation, visual odometry, and SLAM. The International Journal of Robotics Research, 36(2):142-149, 2017.

[41] Alejandro Newell, Kaiyu Yang, and Jia Deng. Stacked hourglass networks for human pose estimation. In European Conference on Computer Vision, pages 483-499. Springer, 2016.

[42] Anh Nguyen, Thanh-Toan Do, Darwin G Caldwell, and Nikos G Tsagarakis. Real-Time Pose Estimation for Event Cameras with Stacked Spatial LSTM Networks. arXiv preprint arXiv:1708.09011, 2017.

[43] Garrick Orchard and Ralph Etienne-Cummings. Bio-inspired visual motion estimation. Proceedings of the IEEE, 102(10):1520-1536, 2014.

[44] Garrick Orchard, Ajinkya Jayawant, Gregory K Cohen, and Nitish Thakor. Converting static image datasets to spiking neuromorphic datasets using saccades. Frontiers in neuroscience, 9, 2015.

[45] Paul K J Park, Baek Hwan Cho, Jin Man Park, Kyoobin Lee, Ha Young Kim, Hyo Ah Kang, Hyun Goo Lee, Jooyeon Woo, Yohan Roh, Won Jo Lee, et al. Performance improvement of deep learning based gesture recognition using spatiotemporal demosaicing technique. In Image Processing (ICIP), 2016 IEEE International Conference on, pages 1624-1628. IEEE, 2016.

[46] Zhe Ren, Junchi Yan, Bingbing Ni, Bin Liu, Xiaokang Yang, and Hongyuan Zha. Unsupervised Deep Learning for Optical Flow Estimation. In AAAI, pages 1495-1501, 2017.

[47] Olaf Ronneberger, Philipp Fischer, and Thomas Brox. U-Net: Convolutional networks for biomedical image segmentation. In International Conference on Medical Image Computing and Computer-Assisted Intervention, pages 234-241. Springer, 2015.

[48] Bodo Rueckauer and Tobi Delbruck. Evaluation of event-based algorithms for optical flow with ground-truth from inertial measurement sensor. Frontiers in neuroscience, 10, 2016.

[49] Deqing Sun, Stefan Roth, and Michael J Black. A quantitative analysis of current practices in optical flow estimation and the principles behind them. International Journal of Computer Vision, 106(2):115-137, 2014.

[50] Jason J Yu, Adam W Harley, and Konstantinos G Derpanis. Back to basics: Unsupervised learning of optical flow via brightness constancy and motion smoothness. In Computer Vision—ECCV 2016 Workshops, pages 3-10. Springer, 2016.

[51] Alex Zihao Zhu, Nikolay Atanasov, and Kostas Daniilidis. Event-based feature tracking with probabilistic data association. In Robotics and Automation (ICRA), 2017 IEEE International Conference on, pages 4465-4470. IEEE, 2017.

[52] Alex Zihao Zhu, Dinesh Thakur, Tolga Ozaslan, Bernd Pfrommer, Vijay Kumar, and Kostas Daniilidis. The Multi Vehicle Stereo Event Camera Dataset: An Event Camera Dataset for 3D Perception. arXiv preprint arXiv:1801:10202, 2018.

[53] Yi Zhu, Zhenzhong Lan, Shawn Newsam, and Alexander G Hauptmann. Guided optical flow learning. arXiv preprint arXiv:1702.02295, 2017.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for estimating an indication of motion using input from an event-based camera, the method comprising:
    receiving events captured by an event-based camera, wherein each of the events represents a location of a change in pixel intensity, a polarity of the change, and a time;
    discretizing the events into time discretized event volumes, each of which contain events that occur within a specified time range;
    providing the time discretized event volumes as input to an encoder-decoder neural network trained to predict an indication of motion using a loss function that measures quality of image deblurring, wherein the loss function minimizes a sum of squares of an average timestamp at each pixel, where the average timestamp for each pixel is generated using bilinear interpolation;
    generating, using the neural network, an estimate of the indication of motion; and
    using the estimate of the indication of motion in a machine vision application.

2. The method of claim 1 wherein the sum of squares is computed by summing the square of the average timestamp of each pixel for each polarity.

3. The method of claim 1 wherein the neural network outputs optical flow values in terms of pixels/bin, wherein the optical flow values are used to compute optical flow per pixel.

4. The method of claim 1 wherein the indication of motion comprises optical flow.

5. The method of claim 1 wherein the indication of motion comprises motion of the event-based camera.

6. The method of claim 1 wherein the indication of motion comprises depth.

7. The method of claim 1 wherein the machine vision application comprises estimating motion of an unmanned vehicle.

8. A system for estimating an indication of motion using input from an event-based camera, the system comprising:
    a time discretized event volume generator for receiving events captured by an event-based camera, wherein each of the events represents a location of a change in pixel intensity, a polarity of the change, and a time and discretizing the events into time discretized event volumes, each of which contain events that occur within a specified time range; and
    an encoder-decoder neural network trained to estimate an indication of motion using a loss function that measures quality of image deblurring, wherein the encoder-decoder neural network receives, as input, the time discretized event volumes and generates, as output, an estimate of the indication of motion, wherein the loss function minimizes a sum of squares of an average timestamp at each pixel, where the average timestamp for each pixel is generated using bilinear interpolation.

9. The system of claim 8 wherein the sum of squares is computed by summing the square of the average timestamp of each pixel for each polarity.

10. The system of claim 8 wherein the neural network outputs optical flow values in terms of pixels/bin, wherein the optical flow values are used to compute optical flow per pixel.

11. The system of claim 8 wherein the indication of motion comprises optical flow.

12. The system of claim 8 wherein the indication of motion comprises motion of the event-based camera.

13. The system of claim 8 wherein the indication of motion comprises depth.

14. A non-transitory computer readable medium having stored thereon executable instructions that when executed by a processor of a computer control the computer to perform steps comprising:
- receiving events captured by an event-based camera, wherein each of the events represents a location of a change in pixel intensity, a polarity of the change, and a time;
- discretizing the events into time discretized event volumes, each of which contain events that occur within a specified time range;
- providing the time discretized event volumes as input to an encoder-decoder neural network trained to estimate an indication of motion using a loss function that measures quality of image deblurring, wherein the loss function minimizes a sum of squares of an average timestamp at each pixel, where the average timestamp for each pixel is generated using bilinear interpolation;
- generating, using the neural network, an estimate of the indication of motion; and
- using the estimate of the indication of motion in a machine vision application.

15. A method for estimating an indication of motion using input from an event-based camera, the method comprising:
- receiving events captured by an event-based camera, wherein each of the events represents a location of a change in pixel intensity, a polarity of the change, and a time;
- generating, from the events, event timestamp images, where each event image includes a first channel that encodes a number of positive events that occurred at each pixel during a time period, a second channel that encodes a number of negative events that occurred at each pixel during the time period; a third channel that encodes the most recent positive event at each pixel, and a fourth channel that encodes the most recent negative event at each pixel;
- providing the event timestamp images as input to a neural network trained using event timestamp images as input and a loss function generated from frame-based camera images synchronized with the event timestamp images as a supervisory signal;
- generating, using the neural network, an estimate of the indication of motion; and
- using the estimate of the indication of motion in a machine vision application.

16. The method of claim 15 wherein the synchronized frame-based camera image includes, for each event timestamp image, a frame-based camera image generated immediately before the event timestamp images and a frame-based camera image generated immediately after the event timestamp image.

17. The method of claim 15 wherein the loss function includes a photometric loss function and a smoothness loss function.

18. The method of claim 15 wherein the indication of motion is optical flow.

19. The method of claim 15 wherein the machine vision application comprises estimating motion of an unmanned vehicle.

20. A system for estimating an indication of motion using input from an event-based camera, the system comprising:
- an event timestamp image generator for receiving events captured by an event-based camera, wherein each of the events represents a location of a change in pixel intensity, a polarity of the change, and a time and generating, from the events, event timestamp images, where each event timestamp image includes a first channel that encodes a number of positive events that occurred at each pixel during a time period, a second channel that encodes a number of negative events that occurred at each pixel during the time period; a third channel that encodes the most recent positive event at each pixel, and a fourth channel that encodes the most recent negative event at each pixel; and
- a neural network trained using event timestamp images as input and a loss function generated from frame-based camera images synchronized with the event timestamp images as a supervisory signal, wherein the neural network receives the event timestamp images as input and generates an estimate of the indication of motion.

21. The system of claim 20 wherein the synchronized frame-based camera images include, for each event timestamp image, a frame-based camera image generated immediately before the event timestamp images and a frame-based camera image generated immediately after the event-based camera image.

22. The system of claim 20 wherein the loss function includes a photometric loss function and a smoothness loss function.

23. The system of claim 20 wherein the indication of motion is optical flow.

24. A non-transitory computer readable medium having stored thereon executable instructions that when executed by a processor of a computer controls the computer to perform steps comprising:
- receiving events captured by an event-based camera, wherein each of the events represents a location of a change in pixel intensity, a polarity of the change, and a time;
- generating, from the events, event timestamp images, where each event timestamp image includes a first channel that encodes a number of positive events that occurred at each pixel during a time period, a second channel that encodes a number of negative events that occurred at each pixel during the time period; a third channel that encodes the most recent positive event at each pixel, and a fourth channel that encodes the most recent negative event at each pixel;
- providing the event timestamp images as input to a neural network trained using event timestamp images as input and a loss function generated from frame-based camera images synchronized with the event timestamp images as a supervisory signal;
- generating, using the neural network, an estimate of an indication of motion; and using the estimate of the indication of motion in a machine vision application.

* * * * *